US012384858B2

(12) United States Patent
Brynolf et al.

(10) Patent No.: US 12,384,858 B2
(45) Date of Patent: *Aug. 12, 2025

(54) METHOD FOR PREPARING AN INHIBITED STARCH

(71) Applicant: SVERIGES STÄRKELSEPRODUCENTER, FÖRENING U.P.A., Fjälkinge (SE)

(72) Inventors: Mikael Brynolf, Kristianstad (SE); Åke Ståhl, Sösdala (SE); Mathias Samuelsson, Kristianstad (SE)

(73) Assignee: SVERIGES STÄRKELSEPRODUCENTER, FÖRENING U.P.A., Fjälking (SE)

( * ) Notice: Subject to any disclaimer, the term of this patent is extended or adjusted under 35 U.S.C. 154(b) by 905 days.

This patent is subject to a terminal disclaimer.

(21) Appl. No.: 17/310,090

(22) PCT Filed: Jan. 31, 2020

(86) PCT No.: PCT/SE2020/050083
§ 371 (c)(1),
(2) Date: Jul. 15, 2021

(87) PCT Pub. No.: WO2020/159429
PCT Pub. Date: Aug. 6, 2020

(65) Prior Publication Data
US 2022/0064338 A1     Mar. 3, 2022

(30) Foreign Application Priority Data

Feb. 1, 2019   (SE) .................................. 1950123-8

(51) Int. Cl.
*C08B 30/12*   (2006.01)
*A23L 29/219*   (2016.01)

(52) U.S. Cl.
CPC .......... *C08B 30/12* (2013.01); *A23L 29/219* (2016.08); *A23V 2002/00* (2013.01)

(58) Field of Classification Search
CPC ....... C08B 30/12; C08B 31/18; C08B 31/185; A23L 29/219; A23L 5/276; A23L 5/273; A23V 2002/00
USPC ........................................................ 536/102
See application file for complete search history.

(56) References Cited

U.S. PATENT DOCUMENTS

| | | |
|---|---|---|
| 2,317,752 A | 4/1943 | Fuller |
| 3,463,668 A | 8/1969 | Evans et al. |
| 3,490,917 A | 1/1970 | Doe et al. |
| 3,687,728 A | 8/1972 | Subbaratnum et al. |
| 3,973,985 A | 8/1976 | Voigt et al. |
| 3,977,897 A | 8/1976 | Wurzburg et al. |
| 4,303,451 A | 12/1981 | Seidel et al. |
| 4,303,452 A | 12/1981 | Ohira et al. |
| 5,725,676 A * | 3/1998 | Chiu .................. A23G 9/52 127/71 |
| 8,268,989 B2 | 9/2012 | English et al. |
| 11,566,084 B2 * | 1/2023 | Brynolf ............... C08B 31/18 |
| 2003/0188738 A1 | 10/2003 | Laleg |
| 2007/0225489 A1 | 9/2007 | Bruun et al. |
| 2013/0309386 A1 | 11/2013 | Han et al. |
| 2015/0239994 A1 | 8/2015 | Santhanam et al. |

FOREIGN PATENT DOCUMENTS

| | | |
|---|---|---|
| CN | 107428848 A | 12/2017 |
| EP | 0382882 A2 | 8/1990 |
| EP | 0721471 A1 | 7/1996 |
| EP | 0811633 A2 | 12/1997 |
| EP | 0811633 A3 | 6/1998 |
| EP | 1664126 B2 | 6/2006 |
| GB | 2506695 A | 4/2014 |
| JP | 61-254602 A | 11/1986 |
| SU | 442185 A1 | 9/1974 |

(Continued)

OTHER PUBLICATIONS

First Office Action mailed Jul. 1, 2022, issued in corresponding Chinese Application No. 202080011851.X, filed Jan. 31, 2020, 17 pages.
Search Report mailed May 18, 2023, issued in corresponding Russian Application No. 2021124208/10, filed Jan. 31, 2020, 2 pages.
International Search Report and Written Opinion mailed May 18, 2020, issued in corresponding International Application No. PCT/SE2020/050083, filed Jan. 31, 2020, 18 pages.
International Preliminary Report on Patentability mailed Aug. 26, 2020, issued in corresponding International Application No. PCT/SE2020/050083, filed Jan. 31, 2020, 12 pages.
Martin, Irvin, "Crosslinking of Starch by Alkaline Roasting," Journal of Applied Polymer Science, vol. 11(7):pp. 1283-1288, Jul. 1967.

*Primary Examiner* — Ganapathy Krishnan
(74) *Attorney, Agent, or Firm* — CHRISTENSON O'CONNOR JOHNSON KINDNESS PLLC

(57) ABSTRACT

A method for preparing an inhibited starch, wherein it comprises the steps of a) providing a slurry containing a granular starch obtained from a starch containing raw material, b) alkalizing the slurry by adding ammonia or by adding one or more compounds having the ability to release or produce ammonia in the slurry, c) adjusting the p H of the slurry to a value above 10.0, preferably up to 12.0, and d) adding at least one oxidant to the slurry for a reaction with said ammonia; or wherein steps b) and c) are replaced with the step of alkalizing the slurry directly to a p H between 0.0 and 12.0, and the step of adding chloramine or dichloramine to the slurry, and wherein step d) is omitted; or wherein step c) is replaced with the step of adjusting the p H of the slurry to a value of between 7.0 and 10.0, and wherein step d) is followed by a step of adjusting the p H of the slurry to a value above 10.0, preferably up to 12.0, is disclosed, as well as an inhibited starch made with said method, use of the inhibited starch as an 1 ingredient in a food product, and a food product containing said inhibited starch.

18 Claims, 9 Drawing Sheets

(56) References Cited

FOREIGN PATENT DOCUMENTS

| | | | |
|---|---|---|---|
| SU | 1735465 A1 | 5/1992 | |
| WO | 00/12746 A1 | 3/2000 | |
| WO | 2013/173161 A1 | 11/2013 | |
| WO | WO 2016/133447 * | 8/2016 | ............. C09B 30/12 |
| WO | WO 2016/133447 A1 * | 8/2016 | ............. C08B 31/00 |
| WO | 2019/032011 A1 | 2/2019 | |

* cited by examiner

METHOD FOR PREPARING AN INHIBITED STARCH

TECHNICAL FIELD OF THE INVENTION

The present invention refers to a method for preparing inhibited starch with improved warehouse storage stability, to a starch having increased viscosity when being cooked in hard water compared to when being cooked in distilled water, to an inhibited starch prepared with the method according to the present invention, to use of said inhibited starch in a food product, and to a food product containing said inhibited starch.

BACKGROUND ART

Starch is an important ingredient for the food industry and is commonly used in applications within industrial food manufacturing processes to impart thickening and maintain texture to the food, as well as to stabilize the water binding in the food product during the time of its shelf life. Natural, non-modified starches known as "native starches" are sometimes used as such, but has several drawbacks in terms of maintaining a short, heavy bodied texture for industrially processed food products due to the extra energy input from shear and the high heat input needed in the process to maintain enough of microbial sanitation after the full heating cycle of such products. To overcome the negative cohesiveness and long stringy textures after such processes it is common to inhibit the granule swelling of the starch and delay it so that when reaching full heating in the process the granular structure of the starch is kept, and therefore a short heavy bodied structure remains after such a heating cycle. This is today achieved by using reactive chemical crosslinking agents which are connected onto the starch molecules by a covalent bonding before it is used in the food industry. This results in a change in its chemical structure, thus making the starch an additive and rendering it to be declared as such under the term "Modified starch" or "Food starch-modified", eventually with its E-number or Ins. No. on the final food product.

In recent years the final ready-made food consumer's attitude towards additives and E-numbers have become more and more negative, and therefore the food industry wants to switch over to use ingredients which do not need to be declared as additives on the package of the final consumer product, rather only as ingredients and thus no need to put it up with its E-number, Ins-number, "modified starch" or "food starch-modified" on the final foods ingredient declaration, only "starch" or eventually together with its botanical source like "maize starch" or "wheat starch".

The primary technical function of starch in food manufacturing is as a thickening agent with a view to providing the requested viscosity, texture, and mouthfeel of the food product. The texture and viscosity properties are built up by hydration of the starch granules obtained when the starch is heated in an aqueous suspension. The granular starch absorbs water when the temperature is increased above its gelatinization temperature, i.e. the starch granule starts to become hydrated and swollen and its viscosity is considerably increased. In the case of using native starch the hydrated and swollen starch granule is fragile. If the temperature is kept for longer periods of time or is increased to higher temperatures, the viscosity will reach its so called "peak viscosity". Accordingly, the granular structure will start to be disrupted and disintegrate after reaching this point and the viscosity will be significantly reduced. Besides the reduced viscosity, another unwanted result is an unpleasant long and cohesive texture. When the heating is performed in an acid environment and/or together with mechanical shearing actions, the breakdown process of the granular structure is further accelerated.

As a result of the above mentioned problems the most important parameters to control or to avoid are high temperatures, shear forces and acidic conditions. It is desirable to change the property of the starch so that the viscosity is stable, or even that it increases during the heating time, thus avoiding the viscosity decrease and granule breakdown when being processed under high heat, strong shear forces, and/or acidic conditions, and also maintaining the integrity of the starch granule in a hydrated and highly swollen state.

The requested effect is often referred to as increased starch robustness. Thus, such a starch is more resistant to high temperatures, longer heating times, high shear forces and to acidic conditions, or combinations of these parameters.

The most commonly used method to increase process tolerance into a starch is to use the technique known as chemical crosslinking utilizing reactive bi-functional reagents which results in chemical modification of the starch molecular structure.

Chemical crosslinking inhibits the granule swelling so that when it is heated in water, the swelling of the granule is delayed after it reaches the gelatinization point. If the level of crosslinking is too low a continued heating combined with strong mechanical shearing forces will make the starch to end up in a total or partial solution. Chemical crosslinking prevents granular breakdown under such treatments. The chemical crosslinking is achieved by substituting hydroxyl groups in the starch molecule with bi-functional reagents which give rise to a covalent bond between the starch molecules. This can be done with certain approved chemicals for making modified food starch additives, e.g. phosphorus oxychloride, STMP (sodium trimetaphosphate), adipic-acetic mixed anhydride and epichlorohydrin (nowadays not used for food purposes anymore but was so in the past). The different approved chemical methods for crosslinking are well described in the literature and are commonly used by the starch industry to inhibit the starch granule swelling. In practice, this means that the starch granule is capable of maintaining its granular integrity by crosslinking the starch granule when it shall be exposed to high temperatures, high shear forces, or high temperatures, together or without shearing actions, as well as an acidic environment. The higher the degree of crosslinking, the more robust the starch will be against those parameters.

In practice, by using the chemical crosslinking modification technique, the starch granule swelling can be adapted to the application and the process in which the starch is to be used, so that optimal properties in form of viscosity and texture are obtained from the starch as such.

There is a great desire among the industry and final consumers to replace chemically modified starches with starches that are not chemically modified, but still behaves like such ones in terms of the swelling of the granule when being heated. This is driven by the trend to go "natural" among food ingredients and not using additives in the formulations and recipes for the final food products, but rather using only ingredients and no additives.

Inhibition of starch granules without the use of chemical crosslinking reagents are known before and can be performed by dry heat inhibition at alkaline conditions, called alkaline dry roasting, which is similar to the manufacturing of so called British Gums. In this method, the starch is subjected to high temperatures at almost moisture free conditions at an alkaline pH, which is reached by addition of e.g. sodium hydroxide, soda or ammonia. Temperatures of 120-160° C. at pH of 8.0-11.0 and a reaction time of 2-120 h give different inhibition levels. This technique is well known and disclosed in the literature (Crosslinking of starch by Alkali Roasting, Journal of Applied Polymer Science Vol. 11 PP 1283-1288 (1967); IRVIN MARTIN, National Starch & Chemical Corporation), and also in several patents (U.S. Pat. No. 8,268,989 B2; EP 0 721 471; EP 1 0382 882; U.S. Pat. Nos. 3,977,897; 4,303,451; Japanese Patent No 61-254602; U.S. Pat. No. 4,303,452; and 3,490,917).

The problem with dry heat inhibition of the starch granule is that it undergoes side reactions during the inhibition step and gives undesirable taste and colour to the starch, i.e. a taste like stamp glue. Discoloration of dry starch at alkaline pH occurs at temperatures above approximately 130° C. To avoid the problems with side reactions the temperature can be reduced, but this causes the reaction time to be prolonged, thereby increasing the production cost significantly. Furthermore, the heat inhibition technology requires high energy costs as almost all moisture has to be driven away and this step absorbs a lot of energy. On top of this, high investment costs are needed as special processing equipment needs to be used, and the hazard for dust explosion means that special security equipment needs to be used as well. Dry starch is prone to cause dust explosion.

Another variant of the technique in the above-mentioned patents focused on dry thermal inhibition is disclosed in WO/2013/173161 (and US 2013/0309386 A1), in which alcohol is used to dehydrate the starch. The alcohol serves as an inhibitor for the starch granule gelatinization during the high heat treatment. The starch/alcohol suspension is then heated under very high pressure to keep the alcohol in a liquid condition above its boiling point. The environment is kept on the alkaline pH scale by addition of soda. Similar treatment temperatures are used as when performing an alkaline dry roasting, as described in the patents above for dry thermal inhibition. The colour of the starch is improved compared with the dry alkaline roasting. The coloured compounds formed during the high heat treatment will be solvent extracted out of the starch by the use of the solvent, i.e. liquid alcohol, at the same time as the inhibition and colour forms. However, as a flammable solvent is used under high pressure and temperature according to this alcohol patent, there is a high hazard for creating an explosion or fire during the treatment. The process needs very expensive pressure reactors to keep the alcohol in a liquid state at the very high temperatures used which makes the process costly.

Hypochlorite may be used in native starch extraction to achieve four results, namely to kill the surplus of bisulphite regularly being used in the starch extraction process, as an antimicrobial substance to control germ growth during extraction, as an inhibitor for enzymatic browning reactions, and also as a microbial sanitizer of the starch due to the often high microbial load resulting from soil contaminated raw material occurred at the harvest. To keep the hygienic levels in the starch produced it is necessary to add something to control the hygienic standard of the produced starch.

It is further known that weak inhibition can be achieved by subjecting the starch granule to low concentrations of a bleaching agent, i.e. an active chlorine oxidant like hypochlorite at an alkaline pH together with protein residuals remaining in the starch. In some cases, the residual protein remaining in the starch after the extraction process can be used, but generally less pure starches than commercially pure starches nowadays are produced to be needed, i.e. above 0.4% protein content of starch dry matter, to incorporate enough of inhibition into the starch granule. This inhibition technology is known and is disclosed in U.S. Pat. No. 2,317,752 and in GB 2506695 (also published as US 2015/0239994 A1). However, the latter methods for inhibiting starch can be performed only to limited levels. If higher levels of oxidant are added to the starch, it will become oxidized and instead lead to a depolymerisation which results in reduced viscosity and easier disruption of the granular structure during the heating of it. The technology in these patents also has the drawback that the inhibition is not storage stable during the time it is stored in the warehouse before it is used by the food manufacturer, thus leading to variable results. The inhibition level changes during such storage times. Also adding the oxidant hypochlorite to a starch which has higher levels of protein residuals leaves more off-tastes and pool water smell caused by formation of side reaction products like chloramines and haloalkanes, thus making the starch less useable as a food product.

When using purer starches, i.e. containing residual protein with less than 0.4%, an inhibition is still achievable as known from EP 1 664 126 B2, but the level of inhibition is rather low compared to what is needed during an industrial food manufacturing as there are too little available nitrogenous oxidation modifiers available. Therefore, it does not fully solve the need to inhibit the starch to sufficient levels, even though the lower amount of residual protein will give better flavour and taste to the starch compared to what is obtainable according to the patent documents disclosed above when using less pure starch when contacting it with hypochlorite. In addition, in the latter document it is not solved how to stabilize the obtained inhibition after the treatment during the storage time in the warehouses before it is used by the food industry.

It is also known that inhibition of granular starch can be achieved by combining the active chlorine oxidant hypochlorite and the amino acid glycine. This process is disclosed in U.S. Pat. No. 3,463,668. By adding glycine to a pure starch it is possible to add enough of nitrogenous oxidation modifier to obtain higher levels of inhibition without adding fatty compounds, which are prone to oxidize and is catalysed by the oxidation from hypochlorite thus causing a smell of fatty acid oxidative rancidity to the starch. However, this method results in a temporary inhibition which is unstable and is thereby not capable of replacing chemically cross-linked granular starches as used by the food industry. It will be stored for longer or shorter times in the warehouses before it is used by the industry. The inhibition is not stabilized during this storage time. It will therefore give variable results when used by the food industry as it varies with the storage time.

In WO 2016/133447 A1 it is disclosed how to stabilize such proteinaceous/amino acid/peptide nitrogenous oxidation modifiers with hypochlorite as an oxidant with a view to inhibit the starch granule swelling for extended storage times in the warehouses until it is used by the food industry, i.e. not changing its swelling behaviour during different storage times. The described procedures as used in e.g. U.S. Pat. No. 3,463,668, EP 1 664 126 B2, U.S. Pat. No. 2,317,752, GB 2506695 and US 2015/0239994 A1 will give variable inhibition during different storage times. In the document WO 2016/133447 A1 residual proteins in the starch and/or added amino acids or other low molecular weight peptides are used for obtaining the inhibition together with a low level of sodium hypochlorite. The obtained inhibition is stabilized for extended storage times in the warehouses by adding antioxidants to the starch, thus changing the temporary labile inhibition to become storage stable.

However, to rely upon the residual protein content in the starch, or to add foreign protein material to it for obtaining the inhibition reaction is a hazard. The reason is that it may turn out that the starch must be labelled as an allergen on the label of the final food products as it may be regarded to be an allergen. It is difficult to fully wash such added protein sources away after the addition to a level where it is not regarded to be an allergen anymore. Relying upon the starch own residual protein level will give different inhibition levels from time to time as this level changes from batch to batch in the production of the extracted starch. This problem shows that there is still a need to develop methods for inhibiting starches to higher levels for the starch granule swelling without the need to add proteinaceous or protein derived materials as nitrogenous oxidation modifiers. Such methods should result in inhibited starches which have improved properties like taste, smell and colour and which at the same time are more cost effective than traditional techniques to produce and overcome the drawbacks with the earlier described techniques without any need for addition of potentially allergenic protein materials to the suspension. Proteins, peptides, and amino acids are also costly materials, so eliminating the need of adding these ones will automatically reduce the production cost for such starch types.

Hypochlorite salts, solutions of such salts or hypochlorous acid intended to oxidize or bleach a starch in water suspension are used at an alkaline pH (i.e. at a pH above 7.0) in order to control the hazard of forming toxic chlorine gas, which otherwise will be formed under acidic conditions. The alkaline agent used is generally some kind of hydroxide solution, even though hypochlorite salt solutions are alkaline on their own. This measure is taken due to the fact that the pH drops when using only hypochlorite as the alkalizing agent after addition. The reason for the pH drop is that the produced carboxylic acids in the starch, which forms when the starch molecule becomes oxidized, yields acids which lowers the pH during the reaction.

Another approach for inhibiting the starch is disclosed in the pending PCT application WO 2019/032011. In this application the starch is inhibited by using e.g. hypochlorite as an oxidation agent, and the above-mentioned needed alkalinity is obtained by adding ammonia or one or more ammonia releasing or generating compound at slightly alkaline conditions. The storage stability which is advantageous during the warehouse storage times is obtained by stabilizing the inhibition in a similar way as in WO 2016/133447 A1. The pH is kept in the range where hypochlorous acid can be found in the system, as calculated from the acid dissociation constant of hypochlorous acid, i.e. with a pKa constant of about 7.5. Thus, in WO 2019/032011 it is specified that the pH range must be between 7.0 and 10.0 in order to obtain the inhibition of the starch, i.e. in the pH area where chloramines can be formed from the reaction between ammonia and hypochlorous acid and at the same time different haloalkanes might be formed. As no foreign proteinaceous material is added, no allergens are added. Very pure starches can be used with a residual protein content of well below 0.4%. As only easily removable ammonia or ammonia generating compounds, e.g. salts, are used as the nitrogenous oxidation modifier, the addition level can be as high as needed to obtain the desired inhibition level. Said compounds are easily removed during the washing step of the starch after the treatment. As the procedure do not add any fatty materials, no off-smells from oxidative rancidity caused by unsaturated fatty acids occur, and a good flavour of the starch is maintained. However, there is a need to further increase the inhibition of starch for use in food and thereby also the warehouse storage stability.

SUMMARY OF THE INVENTION

The object with the present invention is to fulfil the above-mentioned needs, to eliminate the problems disclosed, and to provide an inhibited starch having the desired advantageous properties disclosed. This object is achieved with the method according to the present invention as defined in claim 1. This object is also achieved with the inhibited starch being stabilized for extended storage conditions, with use thereof as an ingredient in food products and with a food product containing said inhibited starch as defined in the subsequent independent claims. Specific and preferred embodiments are disclosed in the dependent claims.

In one aspect the present invention refers to a method for preparation of inhibited starch, wherein it comprises the steps of
  a) providing a slurry containing a granular starch obtained from a starch containing raw material,
  b) alkalizing the slurry by adding ammonia or by adding one or more compounds having the ability to release or produce ammonia in the slurry,
  c) adjusting the pH of the slurry to a value above 10.0, preferably up to 12.0, and
  d) adding at least one active chlorine oxidant to the slurry for a reaction with said ammonia,
  or
  wherein steps b) and c) are replaced with the step of alkalizing the slurry directly to a pH between 10.0 and 12.0, and the step of adding chloramine or dichloramine to the slurry, and wherein step d) is omitted,
  or
  wherein step c) is replaced with the step of adjusting the pH of the slurry to a value of between 7.0 and 10.0, and wherein step d) is followed by a step of adjusting the pH of the slurry to a value above 10.0, preferably up to 12.0.

Thus, the method according to the present invention may be performed according to three different alternative embodiments listed as alternatives in claim 1, each giving an inhibited starch with the desired further improved warehouse storage stability compared to previously known inhibited starches.

In one embodiment the method according to the present invention also comprises a step of adding at least one organic acid, a bisulphite or hydrogen peroxide, to the slurry with a view to eliminating any residual oxidant, off-taste and/or undesired smell.

In one embodiment the method according to the present invention also comprises the step of washing away undesired remaining components in the starch slurry after the reaction in claim 1 while maintaining the pH at above 10.0, followed by a neutralization step in which the pH of the starch slurry is reduced to a pH of 5-7.

In another aspect the present invention refers to a starch prepared with the method according to the present invention, wherein it is distinguished as having an increased viscosity when being cooked in hard water compared with when it is cooked in distilled water.

In another aspect the present invention refers to an inhibited starch with improved warehouse stability prepared with the method according to the present invention.

In still another aspect the present invention refers to the use of said inhibited starch as an ingredient in food products.

In a further aspect of the present invention is a food product containing said inhibited starch.

Thus, with the present invention it has surprisingly been found that an increased inhibition of granular starch may be achieved with an alkali treatment at a pH of above 10.0 using small amounts of ammonia added to or released/produced in the starch slurry as an alkalizing agent in combination with an oxidant, such as a hypochlorite, hypochlorous acid or chlorine dissolved in water. At the same time the undesired formation of carboxylic acids in the starch is reduced.

Thus, the present invention provides a method for increased inhibition of granular starch with low cost inorganic ammonia or with one or more compounds which have the ability to, via an alkalization step, release bound ammonia or produce ammonia, alternatively or in combination, via a deamination of an amino acid using enzymes or via a deamidation of an amide with a strong alkali or acid.

More precisely, said one or more compounds having the ability to release or produce ammonia in the slurry is/are
i) an ammonium compound, preferably an ammonium salt of an acid, preferably an ammonium acetate, chloride, or citrate, and a hydroxide compound, preferably a hydroxide of an alkali metal or an alkali earth metal, to be reacted for releasing ammonia from said ammonium compound,
ii) an enzyme for releasing ammonia from amino acids already present in the slurry from the rest proteins in the starch used,
iii) an oxidant for releasing ammonia from a-amino acids already present in the slurry in rest proteins from the starch used, or
iv) an amide, and optionally an alkali or an acid, for releasing ammonia from said amide in the slurry.

Thus, the ammonia required as reactant in the starch slurry may be provided in several different ways, as disclosed under i)-iv) above. Further, amino acids may be added separately or via proteins to the slurry with a view to serving as a source for ammonia for the reaction with the enzyme under ii) above and the oxidant under iii) above.

Thus, with the present invention it has surprisingly been found that an even higher starch inhibition level is obtained when using the above-defined ammonia/ammonia releasing compound system, which also is disclosed in WO 2019/032011, in combination with an active chlorine oxidant, like a hypochlorite, at a higher level of alkalinity than pH 10.0, i.e. at a pH above 10.0, where practically no hypochlorous acid arising from the added hypochlorite exists in the system. At this high pH the formation of haloalkanes, e.g. trihalomethan, and chloramines, which causes e.g. pool water smell, can be avoided as the formation of these needs reaction with free hypochlorous acid to be formed. The higher pH also hydrolyses any bound chlorine from chlorinated haloalkanes, thereby destroying such compounds if they ever have been formed. At the same time higher levels of starch inhibition are generated than obtained when the pH is in the range of 7.0-10.0, as used in WO 2019/032011. The pool water smell from the reaction which form chloramines is also inhibited, thus improving the organoleptic properties of the final starch. Using the higher pH range of above 10.0 and washing the starch at this alkaline pH, before adding acids to neutralise it, direct after the reaction between ammonia/ammonia releasing or producing compound and the oxidant hypochlorite has been ended eliminates the need for adding one or more organic acids, bisulphite or hydrogen peroxide as reducing substances for eliminating residual hypochlorite which otherwise serves as precursor of undesired side reaction compounds when lowering the pH through the range in which they otherwise can be formed during the neutralisation step with acid addition. Further, any non-reacted hypochlorite which still can remain after the inhibition reaction has been ended is eliminated by the alkaline wash. Such an alkaline wash at the maintained pH level will give a residual protein content of the starch at a minimum content level possible to reach, thus making the starch better suited as an allergen free starch. At the same time the warehouse storage stability will also be improved, and the stability is almost total. Only a minimal variation occurs during the storage time in the warehouses, and this variation can be accepted.

The obtained inhibited starch can also be treated with a stabilizing antioxidant before final use by the food industry as in WO 2019/032011, disclosing how to make starches treated with hypochlorite and nitrogenous oxidation modifiers, i.e. ammonia/ammonia releasing or producing compounds, storage stable during the warehouse times before they are used in the industry. However, this is not necessarily needed, as the higher alkalinity during the treatment tends to make a more stable inhibition with only minor changes during the storage time, without the need for the extra stabilization step being performed with antioxidants.

DETAILED DESCRIPTION OF THE INVENTION AND PREFERRED EMBODIMENTS THEREOF

Figure 1:
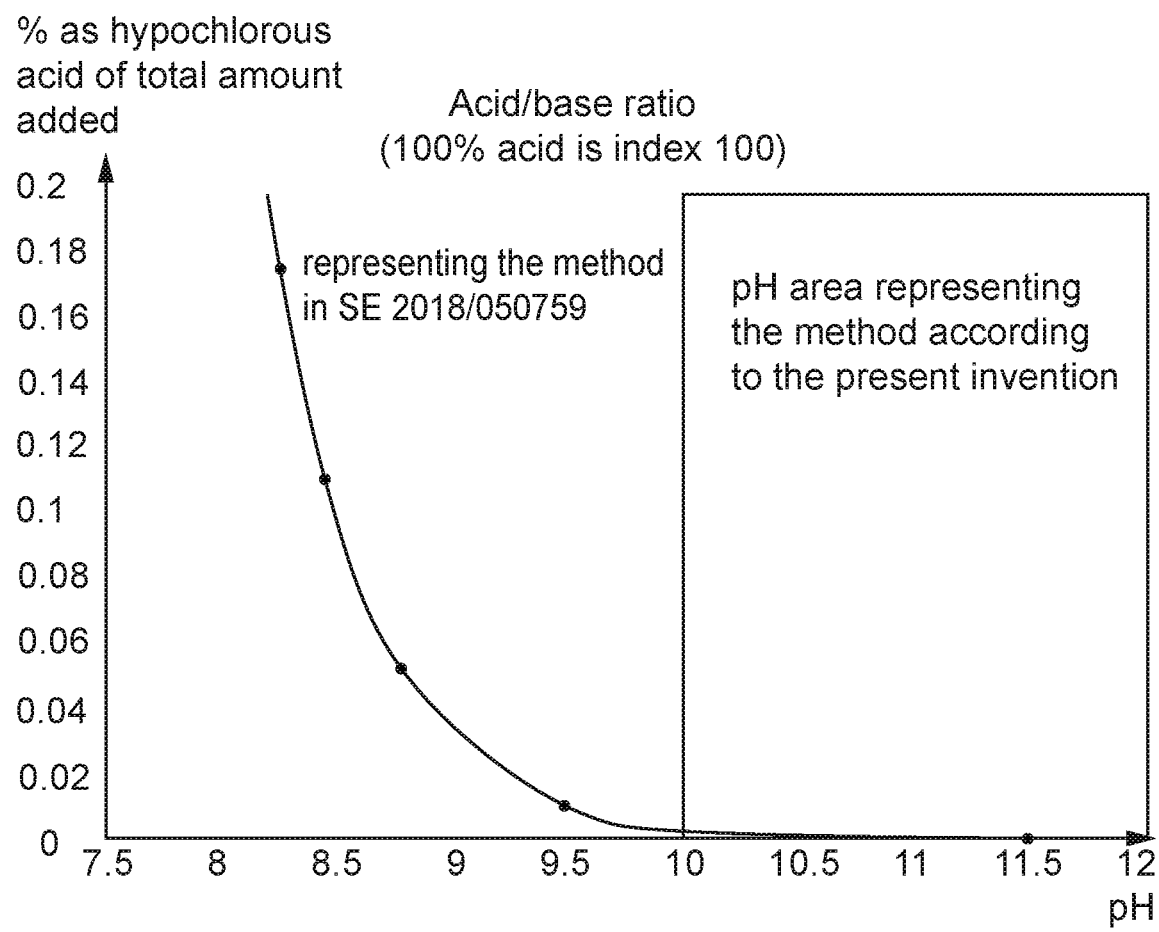
FIG. 1 shows a diagram of the acid/base ratio, in which the % free hypochlorous acid of the total amount added is plotted against the pH value in both the pH area representing the method disclosed in WO 2019/032011 and the pH area representing the method according to the present invention using a zoomed in y-axis setting.

First, some expressions present in the application text are defined below.

The expression "inhibition of starch" used throughout the application text is intended to mean inhibition of the swelling of a starch granule when it is heated in water, after reaching its gelatinization point.

The expression "native starch" used throughout the application text is intended to mean an extracted and purified starch, i.e. having a residual protein content of maximum 0.4% of DM starch, preferably lower than this value, for which the naturally occurring properties have not been changed, either chemically or physically. Thereby the starch is still in its native state as it is in the plant it is extracted from and has unchanged properties. The term native starch is well-known by a man skilled in the art.

The expression "warehouse storage stability" used throughout the application text is intended to mean that such an inhibited starch maintains its inhibition level during storage at typical conditions in warehouses and transports before the starch is used in the food industry to manufacture the food and therefore has the same starch granule swelling characteristics stored as when it was freshly made.

The expression "calculated as active chlorine" used throughout the application text is intended to mean the amount of chlorine bound in its active oxidation state, e.g. the amount of chlorine bound and added in the form of hypochlorite ($ClO^-$) ions in sodium hypochlorite.

The expression "DM" used throughout the application text is intended to mean "Dry Matter", which is a measure of total solids obtained by evaporating a solution under vacuum to dryness or dried in a drying oven at 135° C. to a constant weight. DM may also be referred to as "total solids by drying" or "dry solids". Alternative expressions with an equivalent meaning are "dry substance" and "dry weight".

The expressions "containing active chlorine (x g/l)" and "% w/w active chlorine of DM starch" used throughout the application text is intended to mean the quantity of active chlorine bound and added as e.g. sodium hypochlorite (NaClO) as the active oxidant in gram per litre and in weight percentage per gram DM starch.

The expression "% w/w DM starch" used throughout the application text is intended to mean the percentage of a defined substance calculated as gram per gram of DM starch.

The expression "torsion spring of 350 cmg" used in the examples of the application text is intended to mean the Brabender Amyloviscograph torsion spring setting when evaluating the viscosity profile for such a starch paste. Different torsion springs give different responses due to the sensitivity of the spring load and therefore it is needed to be defined what torsion spring has been used in order to understand the viscosity response level and to be able to compare different Brabender curves. The expression and meaning of "torsion spring cmg" is well-known by a man skilled in the art and is often used in the measurement of starch pastes.

The expression "alkalizing" is meant a pH above 10.0, but below the point when the starch alkali-peptizes and the starch granule lose its granular property and becomes cold water soluble, which without addition of a gelatinization inhibitor, like sodium sulphate, generally starts at room temperature at a pH above 12.0. Thus, in the method according to the present invention a pH of up to 12.0 may be used during the alkalization, still giving satisfactory starch inhibition results.

The expression "slightly alkalizing", is meant that the pH is adjusted to the range of 7.0-10.0, i.e. only slightly above the neutral pH of 7.0.

The starch to be inhibited may be native granular starch or modified starch. In one embodiment modified starch is provided in the slurry used in the initial step a) of the inventive method. In another embodiment the starch is modified after it has been inhibited.

The native or modified starch to be inhibited in the inventive method may be extracted from any variety of starch bearing raw material, such as potato, maize (corn), tapioca (cassava or manioc), barley, rice, wheat, rye, oat, amaranth, quinoa, sago, bean, pea, starch containing algae including different varieties thereof, waxy potato, waxy maize (corn), waxy tapioca, waxy barley, waxy rice, waxy sorghum, waxy wheat, waxy pea and high amylose starches, etc.

In the starch production process the starch is initially extracted from the raw material, purified, and dried into a powder, so called native starch. Starch from all kinds of origin, such as the above-listed raw materials, may be used in food applications, either in its native state or further modified with different technologies, to give desirable properties. The production of native starch from different sources, the methods of modification of the native starch, and its accompanying properties are well-known in the art. The starch used to undergo the inhibition with the inventive method can be produced directly from the starch extraction slurry before it is dried and instead be dried to a powder after the inhibition treatment, as described in the present application.

In one embodiment of the method according to the present invention is a waxy starch, i.e. an amylopectin rich starch with an amylopectin content of the starch DM of more than 90% used. Amylopectin rich starches are considered to be more stable and do not have the need of stabilization by chemical mono-substituents, such as by acetylation, mono-phosphorylation, hydroxypropylation or 2-octenylsuccinylation, to hinder retrogradation from water solutions. It is well-known that the so called waxy starches have better stability properties compared with starches with higher amounts of amylose (non-waxy starches) when it comes to the stability of hydrated starch pastes achieved by gelatinization thereof in water. The stability property is also better for waxy starches when it comes to freeze and thaw stability. Therefore, by combining the present invention with a waxy starch, i.e. waxy maize (corn), waxy tapioca, waxy barley, waxy potato, waxy wheat etc., it is possible to achieve a starch product with properties that are comparable with those of chemically modified amylose containing starches. In this perspective it is possible to create a starch product that can compete with chemically modified cross-linked and stabilized starches, i.e. acetylated, mono-phosphorylated or hydroxypropylated starches made with a crosslink, especially when choosing a naturally freeze/thaw stable starch base like waxy rice, amaranth, waxy barley, waxy tapioca, or other amylopectin starches which are described as having short outer chains (A chain with less than 12 glucose units) in the amylopectin starch structure. However, the stabilization of the starch by mono-substitution is something else than the stabilization obtained with the present invention. Stabilization by mono-substitution of the starch is performed in order to improve the solution stability against retrogradation and not to stabilize the granule swelling.

In the method according to the present invention the granule swelling properties of a native starch, or optionally a chemically modified stabilized mono-substituted starch, i.e. with hydroxypropyl or mono-phosphate groups obtained without using a chemical crosslinking agent, are changed. An acetyl or 2-octenylsuccinyl group substituent reaction has to be performed after the inhibition, as these otherwise will hydrolyse due to the instability of covalent ester bonds to the starch in these kinds of starches. The organic esterbond is not stable at a pH of above about 8.0-8.5 at room temperature. The higher the temperature, the lower the pH needs to be in order to keep the bond intact in such esterified starches.

The treatment with the method according to the present invention in combination with a retrogradation stabilizing mono-substitution reaction with hydroxypropylation or mono-phosphorylation is performed as in WO 2019/032011 by inhibiting the starch granule by alkalizing the starch suspension with ammonia or adding one or more compounds having the ability to release or produce ammonia, e.g. an ammonium compound, such as an ammonia salt, and then alkalizing the slurry or suspension with a base, such as a hydroxide, e.g. sodium hydroxide or potassium hydroxide or the like, in order to liberate the bound ammonia. If the treatment is combined with an acetylated or a 2-octenylsuccinylated starch, the treatment according to the present invention is carried out first and then the reaction with the esterifying reagent is performed at the proper pH value after the inhibition reaction has been performed.

As noted above, it has now surprisingly been found that when the pH is increased above the upper level of 10.0 during the reaction, an even higher degree of inhibition is obtained at the same dosages of ammonia and hypochlorite than in WO 2019/032011, although the pH is outside the range where hypochlorous acid can react with ammonia. In WO 2019/032011 the reactive chloramine, i.e. the active reactant, can be formed in the reaction chamber. One or more washing steps can be performed directly at the higher pH after the ending of the reaction, and all non-reacted hypochlorite ions can be removed before the pH is neutralized and thus comes into the range where free hypochlorous acid are formed from the hypochlorite ion. Therefore, as mentioned above, there is no need for adding any organic acid, such as ascorbic acid, bisulphite or hydrogen peroxide to destroy the active chlorine. As no hypochlorite ions are left when the pH comes into the range of 7.0-10.0 during the neutralisation step, no chloramines or haloalkanes are produced. Thus, they cannot impart bad smell or taste in the final product. Therefore, the starch is provided with an improved flavour profile with less chemicals added.

The inhibited starch is in one embodiment of the present invention obtained by using an extracted and purified native starch to the level where the amount of residual protein is below 0.4% w/w, wherein said starch is considered as a protein free starch. This is as most nowadays commercially available starches are produced. It can also be a less pure starch as the proteins will be removed during an alkaline washing step after ending the reaction. The native starch is further mixed with water resulting in a starch slurry having a concentration of 5-45% w/w, more preferably 20-45% w/w, even more preferably 30-40% w/w. Ammonia, or a compound from which it can be released or liberated, is first added to the slurry. The starch slurry is then heated to 5-70° C., i.e. below the gelatinization temperature for the particular starch used at the surrounding pH condition in the slurry, preferably 10-45° C., more preferably 15-35° C., during continuous agitation with a view to avoid sedimentation of the starch granules and maintaining a homogenous suspension. The pH value is then adjusted to be above 10.0, but at most up to 12.0, preferably 11.0-11.5, by adding an alkali. If the pH is not high enough only from the added or produced amount of ammonia, a stronger alkali, e.g. a hydroxide in water solution, is added in order to obtain the correct pH in the reaction suspension. By keeping the pH above 10.0 during the whole reaction cycle after the addition of the oxidant, the formation of chloramines can be kept negligible. Thus, it does not impart the negative pool water smell which otherwise might occur.

The oxidant, which also acts as a bleaching agent, is added to the starch slurry, which then is kept under agitation. The oxidant is a source of active chlorine, and is in one embodiment a hypochlorite. In a particularly useful embodiment the oxidant is sodium hypochlorite, but it may also be another kind of alkali metal or alkali earth metal hypochlorite, such as potassium hypochlorite, calcium hypochlorite, or magnesium hypochlorite. Although different kinds of hypochlorite's can be used, the present invention is not limited to these. Other sources of active chlorine can be used separately or as a mixture of such different kinds of oxidants providing active chlorine. Thus, one or more different oxidants can be added to the starch slurry. Examples of such compounds are hypochlorous acid or chlorine gas dissolved in water giving hypochlorous acid, which then may be alkalized by addition of a suitable base.

In an alternative embodiment of the method according to the present invention chloramine or dichloramine is added directly to the alkalized starch suspension. The steps of adding ammonia or a compound having the ability to release or produce ammonia, and adding an oxidant, will then not be needed. Chloramine is more preferred than dichloramine, as the latter is a gas at normal operating temperatures. Chloramine is the active reactant formed in WO 2019/032011, resulting from the reaction between ammonia and hypochlorite in situ. Thus, it can alternatively be added directly as the pure reactive compound instead of adding the two above-mentioned reactants. In the method according to the present invention added chloramine or dichloramine will directly be hydrolyzed by the high alkalinity and will thus not be the active reactant here, although an inhibition is still obtained and surprisingly to a higher degree. Thus, in this embodiment the slurry is directly alkalized to a pH between 10.0 and 12.0, followed by the step of adding chloramine or dichloramine to the slurry.

The effect of the oxidant during the oxidation is not fully understood, but it is clear that the active chlorine serving as oxidant is required. It is assumed that it in some way interacts with the ammonia source so that it catalyses internal cross bonds inside the starch granule but without any direct chlorination of the ammonia, as the higher pH level is outside the range in which such reaction products can occur. The assumed theory is that the oxidant in combination with ammonia is working as a catalyst, so that the starch molecules directly can interact with each other to react and form cross bonds, optionally via formation of a starch alkoxide, which is more accentuated at higher alkalinity and thus also at higher pH values. The added amount of oxidant is in the case of sodium hypochlorite as oxidant, calculated as the added amount as active chlorine, 0.03-30% w/w, preferably 0.05-10% w/w, more preferably 0.1-4% w/w. The slurry is then left under stirring so that the inhibition reaction can occur. This reaction is almost instantaneous at a temperature around 30° C. At 15° C. the reaction speed is slowed down and takes some hours, but still occurs. Of practical reasons it is more convenient to let the reaction proceed for a longer time than needed for reaching full inhibition level with a view to securing stable batch to batch results. The reaction time is therefore 1-1500 min, preferably 30-600 min, more preferably 30-240 min. The reaction conditions at a pH of above 10.0 up to 12.0 are such that the amount of free hypochlorous acid is practically zero and most of the ammonia is in its free base form. As there is no free hypochlorous acid, a reaction with free ammonia will not be possible and thus no formation of chloramines or haloalkanes results. If any of these would be formed, they will automatically be hydrolysed due to the high alkalinity during the reaction. As ammonia is a volatile gas with a low smell threshold value, it will have a stronger smell at higher temperatures than at lower ones when being dissolved in water forming ammonia hydroxide. Thus, if this smell is a problem, it is possible to carry out the reaction at a reduced temperature of 15° C., where the smell is low, and to compensate by increasing the reaction time due to the slowed down speed of reaction.

Due to the different pKa values for hypochlorous acid and the ammonium ions, i.e. 7.5 for hypochlorous acid and 9.3 for ammonium ions, different amounts of the added chemicals are available for reaction with each other at different pH values, as calculated from their dissociation in water to the corresponding salt/acid/base forms at different pH values. This means that at a pH of above 10.0 there are practically no available free hypochlorous acid left, only hypochlorite ions. By keeping the pH range at above 10.0 and up to 12.0 it is possible to keep the two reactants in a non-reactive condition with each other without being capable of reacting to form chloramine or haloalkanes, only with the result of an inhibition of the starch granule swelling.

With the present invention it has also been found that the molar ratio between active chlorine and the ammonia source controls the efficiency of the inhibition. Optimum inhibition levels are found in the range of 1/4 to 4/1 between molar active chlorine/molar ammonia. At 1/1 the viscosity will be a bit higher than at 2/1 but similar inhibition level results. Going above 4/1 the result will give a lower viscosity with a lower degree of inhibition.

FIG. 1 shows a graph with a zoomed in y-axis setting illustrating the extremely low %-age values of remaining free hypochlorous acid of the total amount added versus pH for the used system in the pH area representing the method in WO 2019/032011 and in the pH area representing the method according to the present invention.

Figure 2:
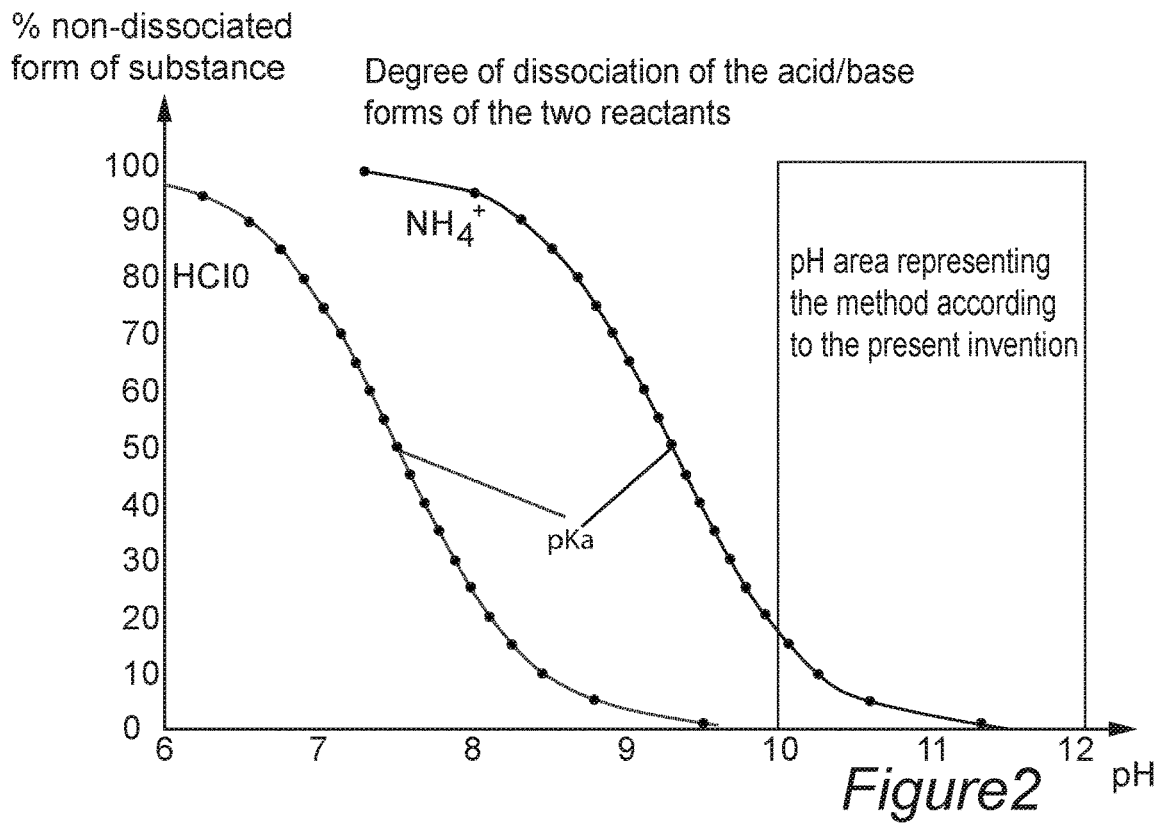
FIG. 2 shows a diagram illustrating the degree of dissociation of the acid/base forms of the two reactants, wherein the %-age of the non-dissociated form of the substance in question is plotted against the pH value in both the pH area representing the method disclosed in WO 2019/032011 and the pH area representing the method according to the present invention using normal x- and y-axis settings.

FIG. 2 shows both the ammonium ion and the hypochlorous acid dissociation system together in the same graph with normal x- and y-axis settings. The pH area representing the method according to the present invention is compared with the pH area representing the method disclosed in WO 2019/032011.

It is well-known by the man skilled in the art that treatment of starch with hypochlorite will oxidize the starch. This results in breakdown of the starch molecule if the starch is contacted with only hypochlorite and an alkalizing hydroxide to obtain an alkaline pH environment. This reduces the molecular weight of the starch with a consequent reduction of its viscosity. Oxidation with hypochlorite will slightly stabilize the starch against retrogradation from a water solution of the starch.

It is of importance to make clear that according to the inventive method the incorporation of carboxylic groups resulting from oxidation of the starch is reduced, and the associated result in breakdown of the starch structure is minimized. When an oxidation is made with an oxidation agent, e.g. hypochlorite, it creates carboxyl groups, —COOH, in the starch molecule. This is well-known, and further specific information can be found in the literature about oxidation of starch. An analysis of the level of carboxyl groups can therefore be used as a method to determine if a starch product has been oxidized or not, and also as a method to define the level of oxidation after such a reaction.

The method of analysis of carboxyl group contents used in connection with the method according to the present invention is performed in accordance with the official method described in "Purity criteria for modified food starches", found in FAO/WHO papers or in the EU legislation. The method is performed in the following way:

The titration is carried out in an ambient tempered solution rather than in a hot solution and by using 0.025 M NaOH titrant solution instead of 0.1 M NaOH, as used in the official procedures. To obtain a higher accuracy, the sample pre-treatment is performed on a larger amount of starch sample so that no losses of starch material results during the filtration step during the sample preparation step of the starch scaled in for the actual titration. The scaled in amount of starch DM for the titration is obtained from the larger prepared and dried sample, thus avoiding losses during filtration of the material being titrated, with a view to obtaining the true amount of starch content for the titration analysis that thus yields higher accuracy from the titration determination.

According to the International purity criteria by JECFA but also to the EU legislation, the maximum level of carboxyl groups that can be added to a starch and still being classified as bleached starch, thus not being regarded as oxidized, is 0.1% w/w DM of starch. As a consequence, it is possible to determine if a starch product has been treated by an oxidation agent and become oxidized or only bleached.

It has been clarified that according to the present invention carboxyl groups are not formed in the starch when the oxidant is combined with ammonia, which is in line with the inventive method, compared to when the starch is oxidized by reacting it with the oxidant on its own without ammonia addition. Thereby, it is clear that no oxidation of the starch molecule has occurred, i.e. below 0.1% carboxyl groups of the starch DM being added, and is at a similar level as found in the native starch before the treatment.

TABLE 1

| SAMPLE | % CARBOXYLIC ACIDS (w/w DM starch) |
|---|---|
| Native waxy maize starch | 0.011 |
| Starch from example 1a | 0.071 |
| Starch from example 1b | 0.041 |
| Starch from example 1c | 0.015 |
| Starch from example 1d | 0.010 |
| Starch from example 2 | 0.018 |
| Starch from example 3 | 0.010 |
| Starch from example 4 | 0.012 |
| Starch from example 6a | 0.011 |
| Starch from example 6b | 0.015 |
| Starch from example 6c | 0.035 |
| Starch from example 6d | 0.130* |
| Starch from example 7a | 0.015 |
| Starch from example 7b | 0.013 |
| Starch from example 7c | 0.026 |
| Starch from example 7d | 0.024 |

*This value is only half of what is expected to be obtained with the amount of added active chlorine from hypochlorite. With the dosage used in Example 6 d) an oxidation to a level of added carboxyl groups of 0.28% would be the result, i.e. not being regarded as a bleached starch but rather an oxidized one.

The amounts of carboxylic groups resulting from the different experiments in the examples are shown in Table 1 above for the used native waxy maize (corn). The level of naturally occurring carboxylic groups in the native starch being used is 0.011% w/w. It can also be seen in Table 1 that the amount of carboxylic groups added to the starch by the treatment with 0.70% w/w of active chlorine alone, as added from hypochlorite (Example 1 a), is higher than when the same native starch is treated with 0.70% w/w active chlorine together with 0.13% w/w ammonia (Example 1 c) in a 2.1/1 mole relation between active chlorine and ammonia at a pH of 9.0 (0.071% instead of 0.015% w/w). Included in Table 1 are also the same treatment levels at the higher pH of 11.5 in the present application with a value of 0.010% w/w (Example 1 d) and only hypochlorite added at the higher pH of 11.5, giving a value of 0.041% (Example 1 b). Thus, the increase of carboxylic groups is lower when combining ammonia and hypochlorite than what is obtained when using the same amount of hypochlorite only without any ammonia added. No extra oxidation occurs at the higher alkalinity during the reaction when combined with ammonia. Thereby, it is clear that by combining active chlorine with ammonia, an oxidation of the starch molecule is avoided, but instead an inhibition of the starch granule swelling in water during a heating cycle is obtained. When the molar ratio of active chlorine to ammonia is increased, a very small increase in formation of carboxylic groups is obtained due to more available hypochlorite acting on the starch. However, when the ratio is kept in the molar range below 4/1 between active chlorine and ammonia the increase in amount of carboxylic groups introduced into the starch is kept below levels which categorise it as an oxidized starch.

When the inhibition reaction has been completed the starch suspension is washed with pure tap water directly after the treatment time at the alkaline high pH used, i.e. at the pH at which the reaction has taken place. In order to wash out all residual chemicals before pH neutralization a check for proper washing out of hypochlorite ions using a KI test is performed on the starch to confirm that there is no residual active chlorine left anymore. This eliminates the need to add an active chlorine destroying chemical, such as an organic acid, bisulphite or hydrogen peroxide. However, an optional addition of an organic acid; e.g. ascorbic acid, erythorbic acid, citric acid, adipic acid, lactic acid, or succinic acid, as well as salt forms of these; hydrogen peroxide or a bisulphite, e.g. a bisulphite salt, is nevertheless possible, but generally not needed. The alkaline washing before the pH neutralisation gives a clean neutral tasting starch powder after being pH neutralised by addition of acid, dewatered and washed.

Thus, it is possible, but not deemed necessary, unless the pH neutralisation step starts without an alkaline washing step, to add an organic acid prior to washing and dewatering the starch with a view to eliminating any active chlorine residuals to act as a chlorine killing agent (reduction agent). Such residuals would otherwise give the starch product an unpleasant off-taste or smell of pool water, i.e. chlorinated water, which is common for starches that have been treated with hypochlorite. The kind of organic acid may be chosen from any one of the organic acids listed above and that normally are used in food products, but preferred are acids which have the ability to act as both reducing agents and oxidizing agents at different environments, like ascorbic acid or erythorbic acid, which in the past have been used to reduce the formation of chloramines in drinking water after treating the water with sodium hypochlorite or chlorine gas. As mentioned above, hydrogen peroxide and bisulphite are also possible to use to destroy the active chlorine if an alkaline washing step is not performed.

The organic acid may be added separately or in a combination of two or more of these. The amount of added organic acid is 0.001-5% w/w DM starch, preferably 0.01-3% 10 w/w DM starch, more preferably 0.05-1% w/w DM starch. The same amounts apply for bisulphite and hydrogen peroxide. The slurry is left under stirring, e.g. for 15-60 min.

The optionally used methods disclosed above of eliminating chlorine taste and smell problems involving adding bisulphite or hydrogen peroxide are well-known procedures for those skilled in the art to use to destroy an excess of hypochlorite ions or chlorine gas so that it no longer possesses any oxidation capability. However, using bisulphite may not be preferred, as it in International food legislation is regarded to be a potent allergen, and if there are more than 10 ppm residual levels in the starch it must be labelled as an allergen when used in food products. Hydrogen peroxide is used to destroy active chlorine at pH levels above 8.5. Below pH 7.0 it does not act as such anymore, but instead as an oxidizing agent, thus increasing the oxidation of the starch molecule instead.

The inhibited starch produced according to the inventive method is almost totally warehouse storage stable. It only shows minor viscosity changes during warehouse storage times, which is different from the results of earlier described starch granule inhibition reactions with nitrogenous oxidation modifiers as described in U.S. Pat. No. 3,463,668, EP 1 664 126 B2, U.S. Pat. No. 2,317,752, GB 2506695 and US 2015/0239994 A1. It has been found that the inhibition disclosed in these patent documents will break down rather rapidly with such techniques and after only a few weeks' storage time in the warehouse under normal conditions the inhibition is significantly lower compared to what is obtained when the starch was freshly made. How to stabilize such inhibited starches with an antioxidant during the warehouse storage times is described in WO 2016/133447 A1 and WO 2019/032011. In the method according to the present invention such a step can be performed as well, but is not needed.

The temperature at which the inhibition reaction takes place is non-thermal. This means that the reaction is performed at a temperature that not is so high that water-free starch is obtained. Thus, the temperature is held below 100° C., e.g. between 5 and 70° C. Such an inhibition is possible for slurries, in contrast to the dry heat inhibition process in which the inhibition takes place at an almost moisture free condition of the starch together with an alkaline substance, like as described in WO 2013/173161 A1, U.S. Pat. No. 8,268,989 B2; EP 0 721 471; EP 1 0382 882; U.S. Pat. Nos. 3,977,897; 4,303,451; Japanese Patent No 61-254602; U.S. Pat. Nos. 4,303,452; and 3,490,917. The stabilized inhibited starch as done in the slurry treatment process described may be further modified by use of any known modification methods used in starch chemical modification, e.g. approved food additive chemical modifications, such as acetylation, hydroxypropylation, chemical crosslinking, OSA (octenylsuccinic anhydride) modification, and/or physical modifications like enzymatic treatments, dextrinization, gelatinization with a view to making the starch cold water soluble, and pre-gelatinization after inhibition with a view to making the starch able to swell in cold water, and/or combinations of two or more thereof. Thereafter, it can be recovered and added as an ingredient for food production. Alternatively, the stabilized inhibited starch may be recovered from the slurry by just further washing and drying and can then be added as an ingredient when making a food product.

Examples of food products in which the inhibited starch may be used are different kinds of sauces, soups, dairy products, e.g. fermented Crème Fraiche and yoghurt; batters and breading; fruit preparations for dairy products and/or baked products, e.g. bake stable fruit preparations; and milk based desserts, e.g. different puddings, vanilla sauces, ice cream, and mousse, etc.

It has also surprisingly been found that the inhibition level obtained when performing the inventive method in such a way that after the step of adding ammonia or an ammonia producing or releasing compound, the pH of the slurry is adjusted to a value between 7.0 and 10.0, followed by the step of adding an oxidant, as done in WO 2019/032011, and after the reaction has ended at this pH further adjusting the pH to a value of above 10.0, preferably up to at most 12.0, more preferably 11.0-11.5 a further inhibition is obtained. After such an alkalinity treatment a more inhibited starch results that equals the level of inhibition that is obtained when performing the treatment at a pH of above 10.0 directly. This is different from the theory in WO 2019/032011 that the pH needs to be kept in the area where chloramine's can be formed, i.e. 7-10.0. The effect that the inhibition level can be further increased after the reactants have been consumed just by increasing the pH above the level where the reaction has taken place, yields an unexpected further increase in inhibition level is surprising and earlier not been expected. This two-step pH treatment constitutes one alternative embodiment of the method according to the present invention.

EXAMPLES

Example 1

Examples 1 a) and 1 b) show the effect from a hypochlorite treatment only on the starch at a pH of 9.0 and at pH of 11.5 without the oxidation modifier/inhibitor ammonia. Example 1 c) shows how the starch produced in accordance with WO 2019/032011 maintains resistance from oxidation by the addition of ammonia and how, at the same time, an inhibition is obtained of the granular starch using the same active chlorine level from sodium hypochlorite as in Example 1a). Example 1 d) shows the effect of the present invention that by using the same levels of sodium hypochlorite and ammonia at the higher pH of 11.5, a higher inhibition level, without any oxidation of the starch molecule, is obtained. The granular starch raw material is waxy maize (corn) starch with a residual protein content of less than 0.4%, as analysed by the Kjeldahl method and calculated with a protein conversion factor of 6.25.

1a) 0.70% Active Chlorine at pH 9.0

869.1 g of DM waxy corn starch (1 kg as is weight) was mixed with 1600 g cold tap water in a reaction vessel. The pH was adjusted to 9.0 with a diluted sodium hydroxide solution in water with a concentration of 3% w/w. The temperature was adjusted to 30° C. 56.9 ml sodium hypochlorite solution with active chlorine (107 g/l; density: 1.19 g/cm$^3$) was slowly added during agitation to keep the pH as close as possible to 9.0. Any needed pH adjustment was performed by adding sulphuric acid or NaOH solution during the hypochlorite addition. The added amount of hypochlorite solution contained totally 6.1 g active chlorine. This corresponds to an addition of 0.70% w/w active chlorine of DM starch. The vessel was left under agitation for 180 min after all hypochlorite had been added, and the temperature was kept at 30° C. The starch was directly dewatered on a vacuum filter and washed clean with fresh tap water. The starch filter cake was suspended again in fresh tap water, and the elimination of all hypochlorite during the reaction was checked before the starch was neutralized to a pH of 6.0 with sulphuric acid using a KI test. The starch was further dewatered and dried to a powder with a moisture content of below 15%.

1 b) 0.70% Active Chlorine at pH 11.5

869.1 g of DM waxy corn starch (1 kg as is weight) was mixed with 1600 g cold tap water in a reaction vessel. The pH was adjusted to 11.5 using a diluted sodium hydroxide solution in water with a concentration of 3% w/w. The temperature was adjusted to 30° C. 56.9 ml sodium hypochlorite solution with active chlorine (107 g/l; density: 1.19 g/cm$^3$) was slowly added during agitation to keep the pH as close as possible to 11.5. Any needed pH adjustments were performed by adding sulphuric acid or NaOH solution during the hypochlorite addition. The added amount of hypochlorite solution contained totally 6.1 g active chlorine. This corresponds to an addition of 0.70% w/w active chlorine of DM starch. The vessel was left under agitation for 180 min after that all hypochlorite had been added, and the temperature was kept at 30° C. The starch was directly dewatered on a vacuum filter and washed clean with fresh tap water. The starch filter cake was suspended again in fresh tap water, and the elimination of all hypochlorite during the reaction was checked with a KI test before the starch was neutralized to a pH of 6.0 with sulphuric acid. The starch was further dewatered and dried to a powder with a moisture content of below 15%.

Examples 1 a) and 1 b) show that an oxidation of the starch is obtained at both pH values when only hypochlorite is added during the reaction. This yields carboxyl groups and results in a certain oxidation of the starch, as seen in Table 1 and FIG. 3. The oxidation of the starch is seen in the Brabender profile in FIG. 3 as a reduction of the viscosity response. When the viscosity of the starch after reaching the peak viscosity drops drastically during the heating cycle it is due to that the swollen starch granule is disintegrated, falls apart, and goes into solution in the water.

1 c) 0.70% Active Chlorine of DM Starch Together with Ammonia (0.13% Nitrogen/DM Starch) in a 2.1/1 Mole Ratio Between Active Chlorine and Ammonia in a Test Performed as Exemplified in Example 3 b) in WO 2019/032011 at a pH of 9.0

Figure 3:
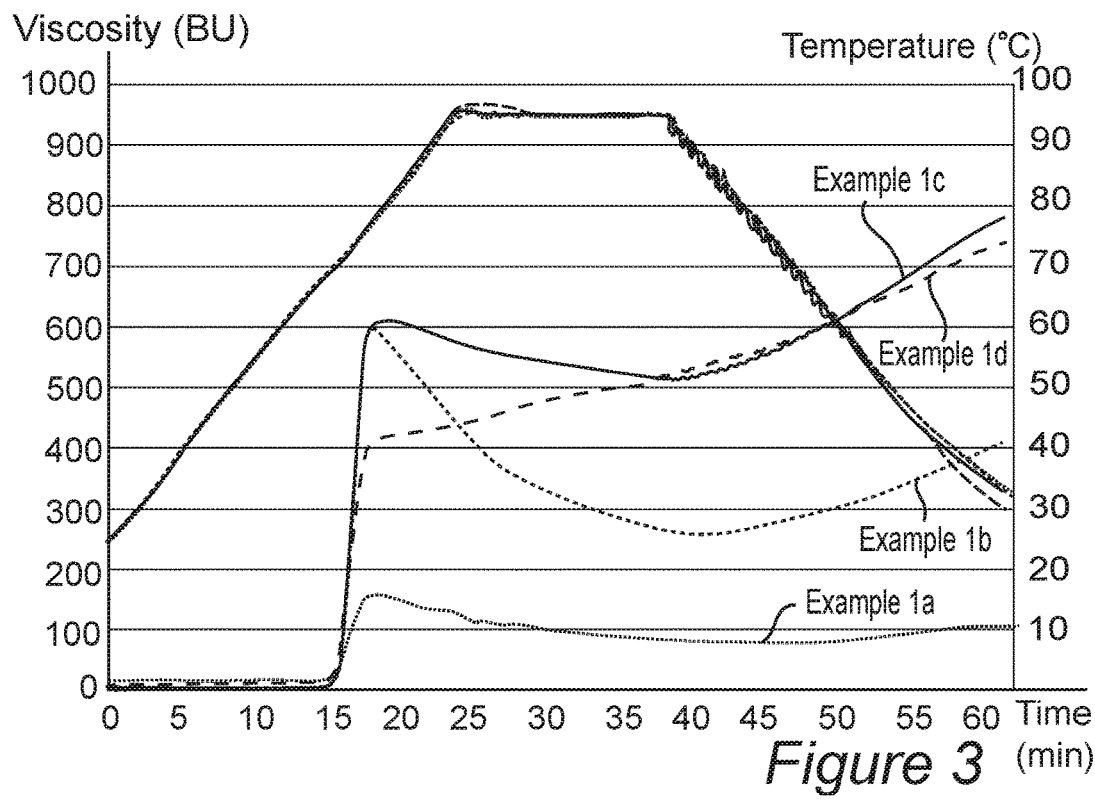
FIG. 3 shows the difference in oxidation of starch in Examples 1 a)-1 d), wherein the viscosity of the starch products obtained is plotted against time together with the temperature slope during the run.

This test exemplifies that no oxidation of the starch is achieved and that, at the same time, a certain inhibition level is obtained when using the combination of hypochlorite and ammonia at slight alkaline condition, as described in WO 2019/032011 and is seen in Table 1 and FIG. 3.

869.1 g DM waxy maize (corn) starch was mixed with 1600 g cold tap water in a reaction vessel. 4.3 g $NH_4Cl$ was added and dissolved. After this the pH was adjusted to 9.0 using a 3% sodium hydroxide solution. The temperature was adjusted to 30° C. 56.9 ml sodium hypochlorite with active chlorine (107 g/l; density: 1.19 $g/cm^3$) was added during agitation. The added amount of hypochlorite solution contained totally 6.1 g active chlorine. This corresponds to an addition of 0.70% w/w active chlorine of DM starch. The vessel was left under agitation for 180 min, and the temperature was kept at 30° C. 2.6 g of an antioxidant, i.e. ascorbic acid, was added during agitation. The starch slurry was left under agitation for 30 min, and was then dewatered to 55% DM and further washed with fresh tap water. It was then mixed again with 890 g fresh cold tap water. 10.4 g of citric acid was added during agitation. The starch slurry was left under agitation for 30 min, and the pH was further adjusted to 6.0 with sodium hydroxide. The starch product was dewatered and dried to a dry powder with a moisture content of below 15%.

1 d) 0.70% Active Chlorine of DM Starch Together with Ammonia (0.13% Nitrogen/DM Starch) in a 2.1/1 Mole Ratio Between Active Chlorine and Ammonia at a pH of 11.5

This test exemplifies that no oxidation of the starch is achieved and that a higher inhibition level is achieved when using hypochlorite and ammonia at higher alkaline conditions than between 7.0 and 10.0. This results in a higher inhibition level after the treatment at the higher pH of 11.5, as seen in Table 1 and in FIG. 3, where the products achieved from Examples 1 a), 1 b), 1 c), and 1 d) are evaluated using a Brabender Amyloviscograph model E run with 75 rpm and a dry solids level of 5% w/w using distilled water and a torsion spring of 350 cmg. The evaluation was made at a neutral pH, wherein the results are shown in an overlay of the profiles in FIG. 3.

869.1 g DM waxy maize (corn) starch was mixed with 1600 g cold fresh tap water in a reaction vessel. 4.3 g $NH_4Cl$ was added and dissolved. After this the pH was adjusted to 11.5 using a sodium hydroxide solution. The temperature was adjusted to 30° C. 56.9 ml sodium hypochlorite with active chlorine (107 g/l, density: 1.19 $g/cm^3$) was added during agitation. The added amount of hypochlorite solution contained totally 6.1 g active chlorine. This corresponds to an addition of 0.70% w/w active chlorine of DM starch. The vessel was left under agitation for 180 min, and the temperature was kept at 30° C. 2.6 g of an antioxidant, i.e. ascorbic acid, was then added. The antioxidant was added with a view to comparing the effects of the pH value between the present invention and the invention disclosed in WO 2019/032011 at similar conditions, as well as for comparing purposes in the taste test in Example 5. The starch slurry was left under agitation for 30 min. The starch slurry was dewatered to 55% DM and was further washed with fresh tap water. Then it was mixed again with 890 g cold fresh tap water. 10.4 g of citric acid was added during agitation. The starch slurry was left under agitation for 30 min and was then adjusted to a pH of 6.0 with sodium hydroxide solution. The starch product was further dewatered and dried to a dry powder with a moisture content of below 15%.

The results shown in Table 1 and in FIG. 3 illustrates that no oxidation of the starch is obtained when treating the starch with hypochlorite in combination with ammonia or an ammonia releasing compound. The level of added carboxylgroups when adding an ammonia compound is at the native starch level even though hypochlorite has reacted. In FIG. 3 the inhibition of the starch granule is seen as a less viscosity breakdown after reaching the peak viscosity for the pH 9 example (1 c), and after the cooling cycle the viscosity is significantly higher. The achieved inhibition is further increased when adding more hydroxyl ions before the treatment with hypochlorite so that the pH increases to above 10.0. In the example for the pH of 11.5 (1 d) the extra inhibition obtained is seen from that a peak viscosity is not obtained due to that the granule integrity is kept and it continues the swell during the heating cycle showing much more granule integrity from the starch granule swelling inhibition. This demonstrates that a higher inhibition level is reached by combining ammonia with active chlorine at a higher hydroxide ion level, i.e. at a higher pH, than earlier known. This will increase the inhibition of the starch granule swelling to a higher degree than compared with a lower level of hydroxide ions, as described in WO 2019/032011.

Example 2

This example shows one of the alternatives of the method according to the present invention, i.e. that it is possible to first carry out the treatment with added ammonia and oxidant at a pH of 9.0, i.e. at a pH of between 7.0 and 10.0. After this treatment, when all the oxidant hypochlorite has been consumed, it is possible to achieve a higher inhibition level by increasing the pH further by adding more alkali so that a pH of above 10.0 and up to 12.0 is obtained, then keeping the slurry at that pH for a time, and then obtaining a similar higher level of inhibition as if the reaction had been performed directly from start at the higher pH.

After the reaction done in Example 1 c) at 30° C. and pH 9.0 extra alkali was added to obtain a pH of 11.5 using a 3% w/v NaOH solution. The temperature was kept at 28° C. for a further 120 min. After this step the starch was directly dewatered on a vacuum Buchner funnel and washed clean with fresh tap water from any remaining hypochlorite solution, as checked with a KI test on a small sample from the wet starch cake. When the starch filter cake was clean it was suspended in fresh tap water and then neutralised using a sulphuric acid solution. After this it was once again dewatered on a vacuum Buchner funnel, and neutralisation salts were washed out with fresh tap water. After this the starch were dried to a moisture level of below 15%.

Figure 4:
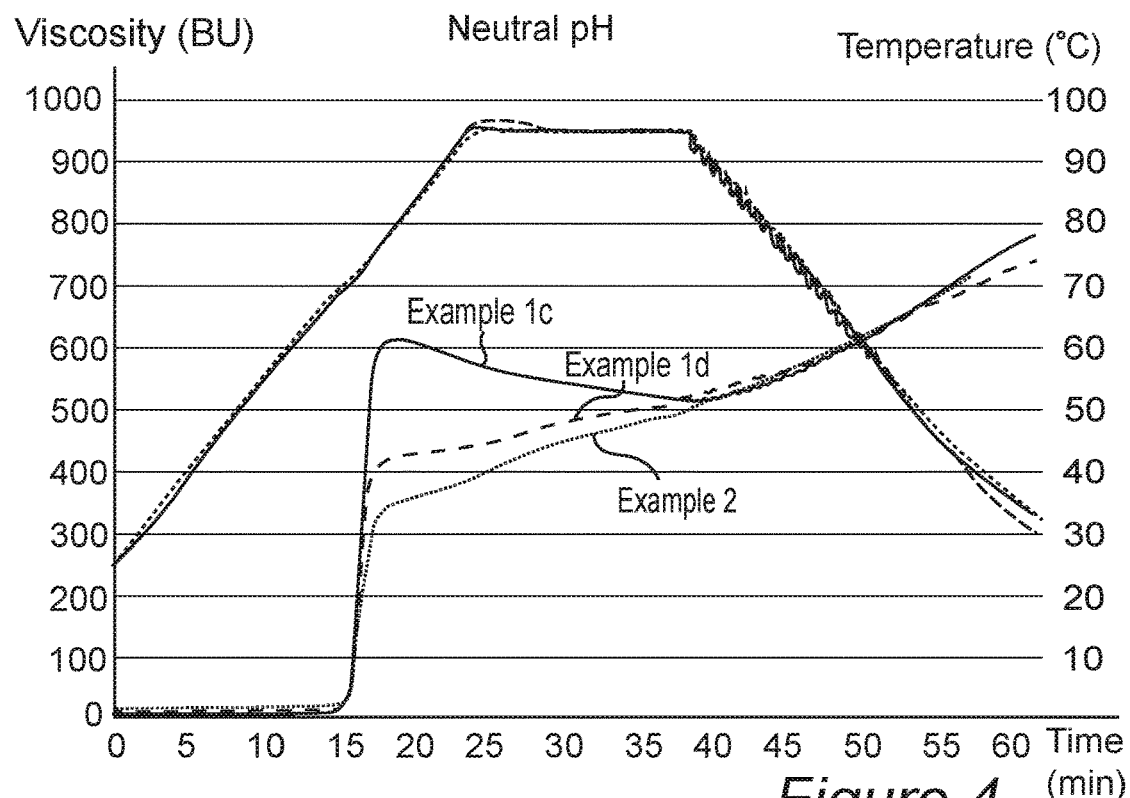
FIG. 4 shows the difference in oxidation of starch in Examples 1 c), 1 d), and 2 at neutral pH, wherein the viscosity of the starch products obtained is plotted against time together with the temperature slope during the run.
Figure 5:
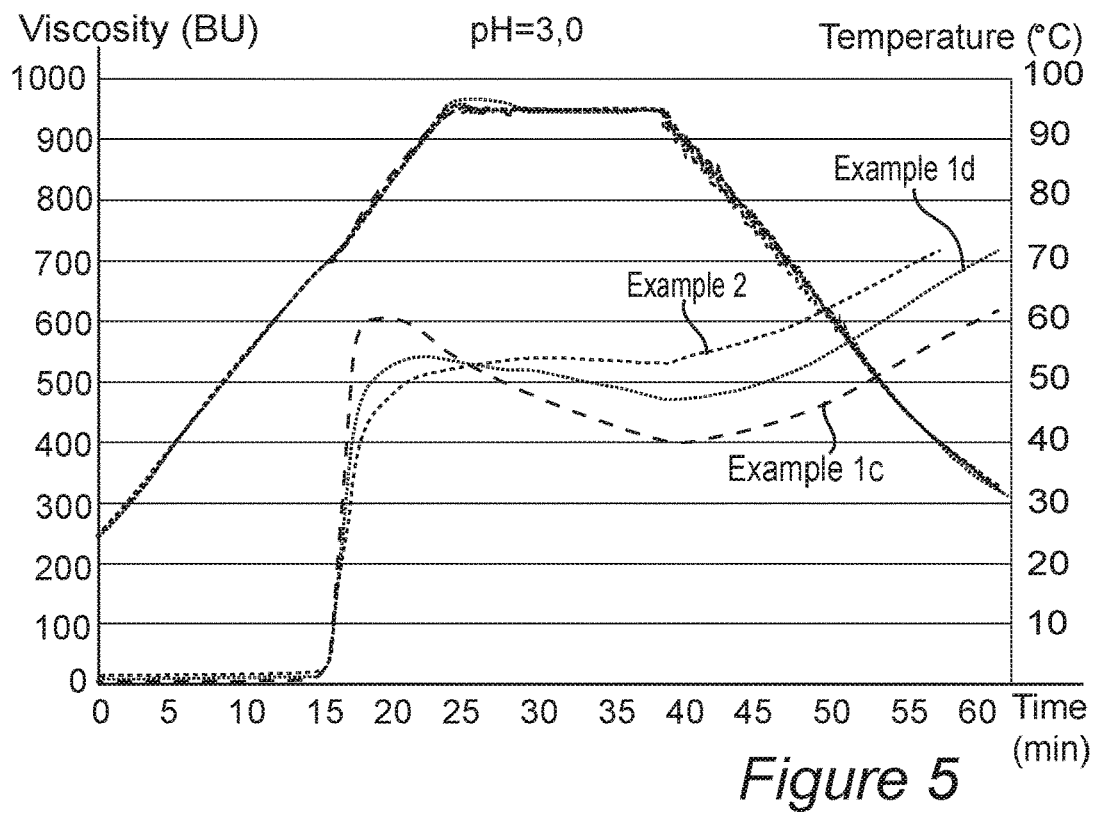
FIG. 5 shows the difference in oxidation of starch in Examples 1 c), 1 d), and 2 at pH of 3.0, wherein the viscosity of the starch products obtained is plotted against time together with the temperature slope during the run.

The products from Examples 1 c), 1 d), and 2 were evaluated using a Brabender Amyloviscograph model E run with 75 rpm and a dry solids level of 5% w/w using distilled water and a torsion spring of 350 cmg. The evaluation was made at both neutral pH and at an acid pH of 3.0, wherein the results are shown in an overlay of the profiles in FIG. 4 (neutral pH) and FIG. 5 (pH 3.0). It is seen in FIG. 4 that the product using a pH of 9.0 gives the lowest degree of inhibition of the three runs. When the reaction is carried out at a pH of 11.5 instead of 9.0 a higher level of inhibition is obtained, as described earlier. When combining the treatment by first performing the reaction at a pH of 9.0 and then increasing the pH to 11.5, the slope gets more like when the reaction is performed directly at a pH of 11.5, but even a bit higher level of inhibition is obtained as the granule swelling is kept back a bit more in Example 2 than in Example 1 d). In FIG. 5 the same result is also exemplified but using a pH of 3.0 in the test instead. A lowering of the pH value during a starch cook is a way to speed up the granule swelling of the starch when full granule swelling is not obtained at a neutral pH. The increase in the degree of inhibition is seen in FIG. 5 in that the temperature when the starches reach full peak viscosity is higher at a pH of 11.5 than at a pH of 9.0 and in that the double treatment product from Example 2 has the highest temperature when it reaches full swelling. They are also more stable towards acidic hydrolysis as the viscosity is kept better than the pH 9.0 material, which also is an indication for a higher degree of starch granule swelling inhibition.

Example 3

This example shows that the starch is almost fully stable and shows only minor viscosity changes during the warehouse storage time without any extra additions of antioxidants.
0.70% Active Chlorine+4.3 g $NH_4Cl$ (0.13% Nitrogen/DM Starch) in a 2.1/1 Mole Ratio Between Active Chlorine and Ammonia.

869.1 g of DM waxy corn starch was mixed with 1600 g cold tap water in a reaction vessel. 4.3 g $NH_4Cl$ was added during agitation. The pH was adjusted to 11.5 with a 3% w/v NaOH solution. The temperature was adjusted to 30° C. 56.9 ml sodium hypochlorite with active chlorine (107 g/l; density: 1.19 g/cm$^3$) was added during agitation. The added amount of hypochlorite solution contained totally 6.1 g active chlorine. This corresponds to an addition of 0.70% w/w active chlorine of DM starch. The vessel was left under agitation for 180 min, and the temperature was kept at 30° C. The starch slurry was dewatered to 55% DM and was washed clean with fresh tap water until a KI test showed that the starch filter cake was free from residual hypochlorite. After this the starch filter cake was further mixed with 890 g fresh cold tap water. The starch slurry was adjusted to a pH of 6.0 with sulphuric acid. The starch product was dewatered and dried to a dry powder with a moisture content below 15%.

Figure 6:
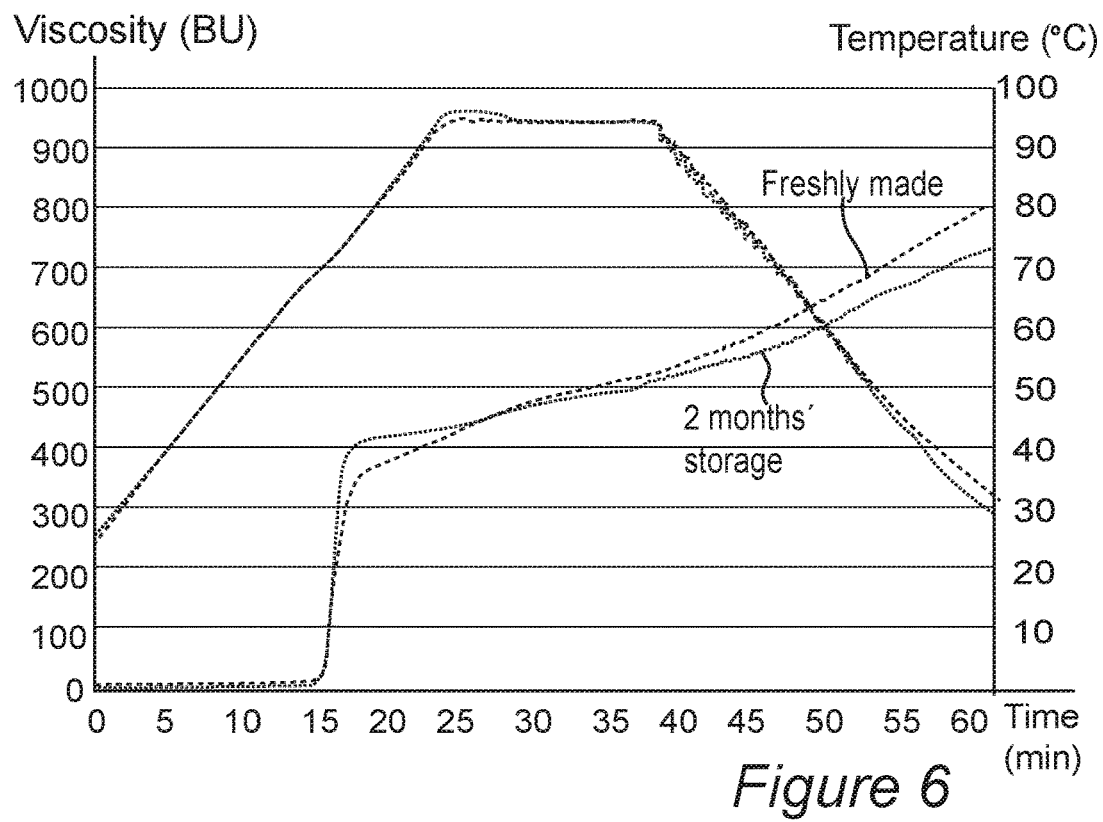
FIG. 6 shows the results of a stability test, wherein the viscosity is plotted against time for starch products together with the temperature slope during the run, wherein they either are freshly made or have been stored during 2 months, and wherein the starch slurry previously had been adjusted to neutral pH-value.
Figure 7:
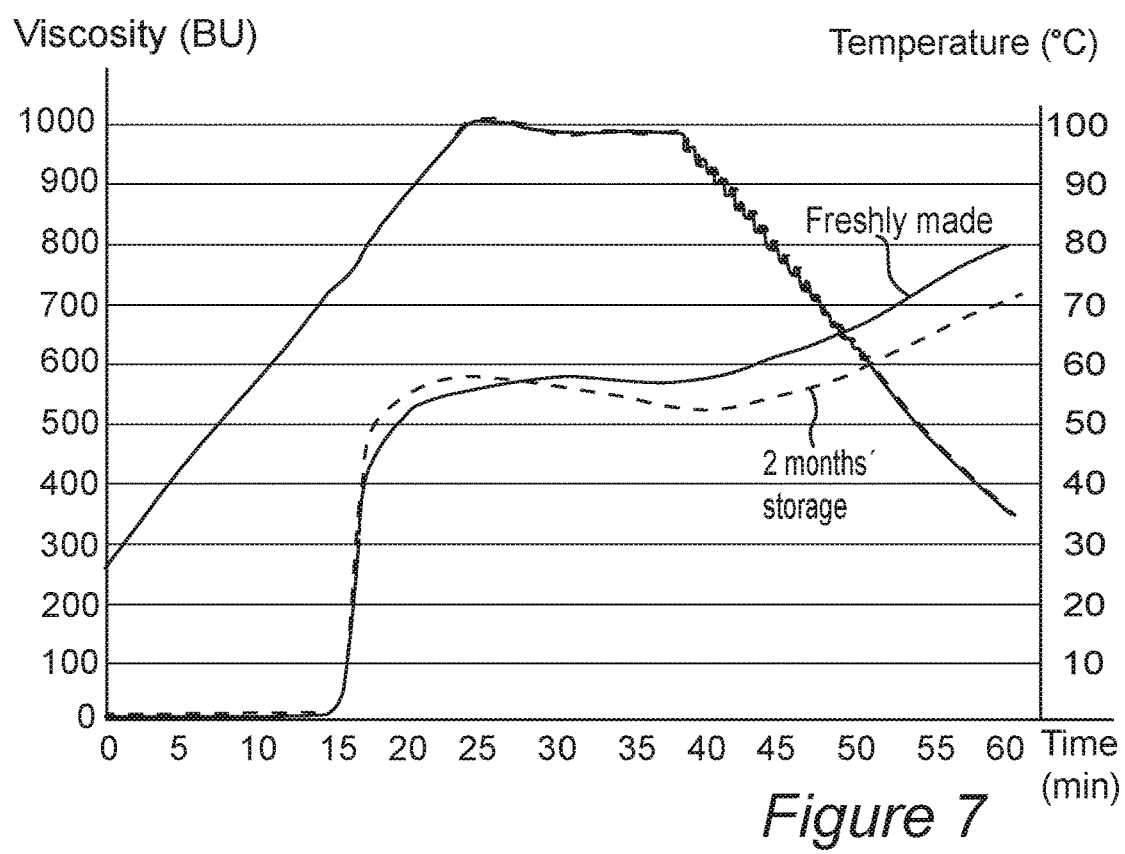
FIG. 7 shows the results of a stability test, wherein the viscosity is plotted against time for starch products together with the temperature slope during the run, wherein they either are freshly made or have been stored during 2 months, and wherein the starch slurry previously had been adjusted to a pH-value of 3.

The product was run with the Brabender test described in the previous examples, both as a freshly made product as well as after a storage time of 2 months as a dry powder. The stability of the product is shown in FIG. 6 at a neutral pH. The same products when run at a pH of 3.0 are shown in FIG. 7. It is seen in these two figures that no drastic viscosity change is obtained during the two months' storage time. There was only a slight change which is so small that it can be accepted without a need for adding the extra antioxidant system as used in WO 2019/032011 at a pH of 9.0.

It is seen in the FIGS. 6 and 7 from the viscosity profile during the heating and the cooling cycles that the viscosity response is almost the same with only a slightly lower degree of inhibition after 2 months' storage time. In the pH 3.0 run in FIG. 7 a slight viscosity degradation is obtained during the hot temperature holding time. This is seen in the neutral run in FIG. 6 as a slightly more rapid viscosity build-up in the beginning of the swelling of the granule after being stored, however to a very limited level of change.

Example 4

This example shows that the treatment can be carried out at lower temperatures but with longer reaction times.

869.1 g DM waxy maize (corn) starch was mixed with 1600 g cold fresh tap water in a reaction vessel. 4.3 g $NH_4Cl$ was added and dissolved. After this the pH was adjusted to 11.5 using a 3% sodium hydroxide solution. The temperature was adjusted to 15° C. 56.9 ml sodium hypochlorite with active chlorine (107 g/l; density: 1.19 g/cm$^3$) was added during agitation. The added amount of hypochlorite solution contained totally 6.1 g active chlorine. This corresponds to an addition of 0.70% w/w active chlorine of DM starch. The vessel was left under agitation from the afternoon until the morning the next day (16 h) while keeping the temperature constant at 15° C. 2.6 g of an antioxidant, i.e. ascorbic acid, was added during agitation. The starch slurry was left under agitation for 30 minutes. The starch slurry was dewatered to 55% DM and was further washed with fresh tap water. Then it was mixed again with 890 g cold fresh tap water. 10.4 g of citric acid was added during agitation. The starch slurry was left under agitation for 30 min and was further adjusted to a pH of 6.0 with sodium hydroxide. The starch product was further dewatered and dried to a dry powder with a moisture content of approximately 15%.

Figure 8:
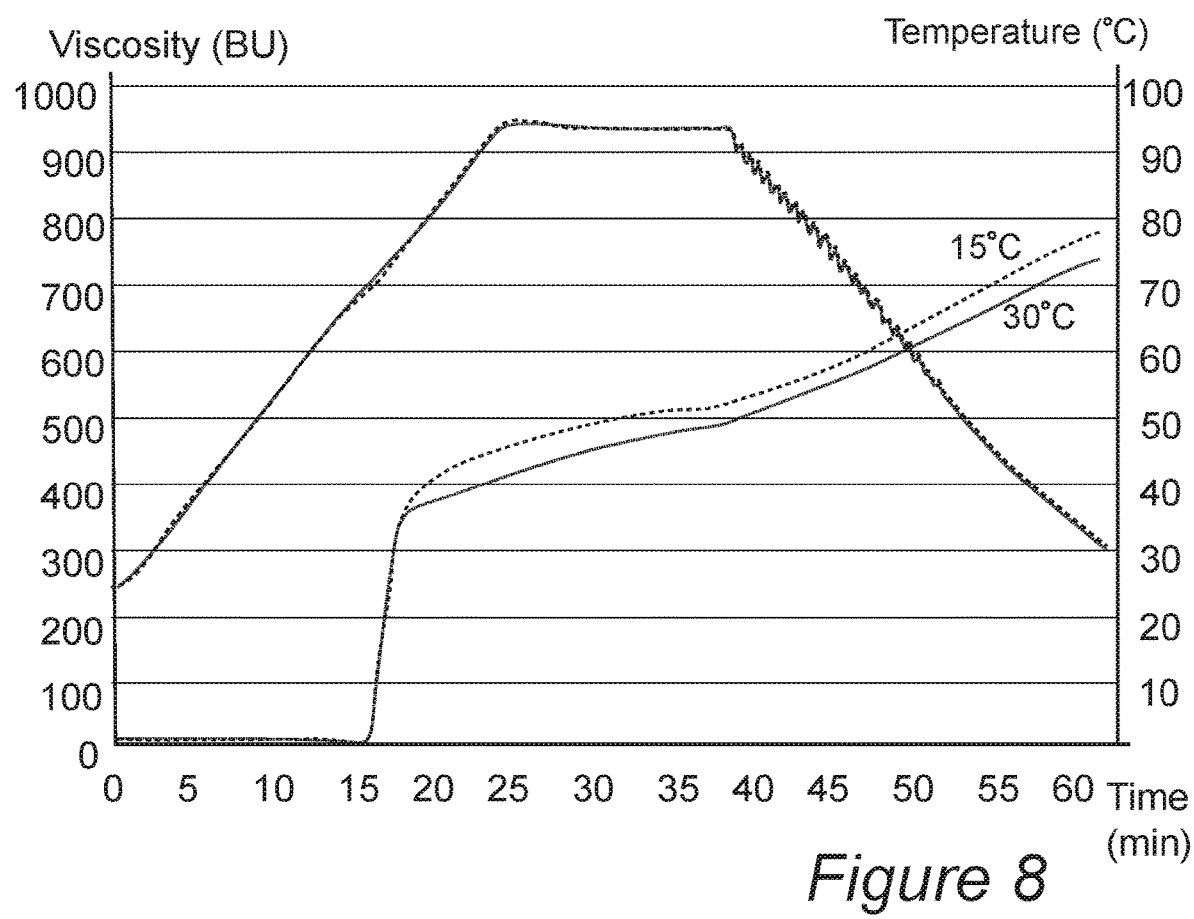
FIG. 8 shows the viscosity plotted against the temperature together with the temperature slope during the run for the product obtained in Example 1 d) at either 15 or 30° C. at a neutral pH-value.

This product was run and evaluated with the Brabender test described in the previous examples with the same product made at 30° C., i.e. the product from Example 1 d), with a reaction time of 180 min. The result is shown in FIG. 8. It is seen in FIG. 8 that almost identical profiles are obtained when the reactions have been performed at 30° C. or 15° C. but extending the reaction time at the lower temperature.

Example 5

The products made according to Examples 1 d) and 3, in which the addition of ascorbic acid has been eliminated, showed that the starch made with this reaction will have a good taste profile without the need to eliminate chloramines or haloalkanes by extra additions of chemicals. As the reaction is performed outside the pH range in which such compounds can be formed, and also as the washing out of the hypochlorite ions is performed before the pH neutralisation, this will give a product with equivalent taste as if ascorbic acid as taste improver had been added or not.

Fruit preparations were made according to the following basic formulation with the starches produced from Examples 1 d), and 3 above:
Raspberry 30%
Sugar 30%
Starch 5%
Water 35%

The starch was suspended in the water and the raspberries were mixed in. The mix was heated to boiling under agitation on a stove. When the mix started to boil the sugar was added and dissolved. The fruit preparation was cooled down and tested by a trained taste panel.

Only one test person commented on a maize/corn flavour on the fruit preparation prepared from this example. 9 persons had no comments at all for off-taste or off-flavours for the two fruit preparations made with the different ways of eliminating the active chlorine from the reaction mixture. The comment on maize flavour is understandable as the starches are made from a maize starch, which is known to interact with the flavour release in delicately flavoured food preparations. The conclusion is that by ending the reaction at a high pH and washing out residual hypochlorite ions directly at the high pH before any pH neutralisation is performed, the hazard for producing off-flavours from haloalkanes and chloramines will be eliminated. By doing it in this way one washing step can be saved in the manufacturing of the starches, and less chemicals may be used.

Example 6

Figure 9:
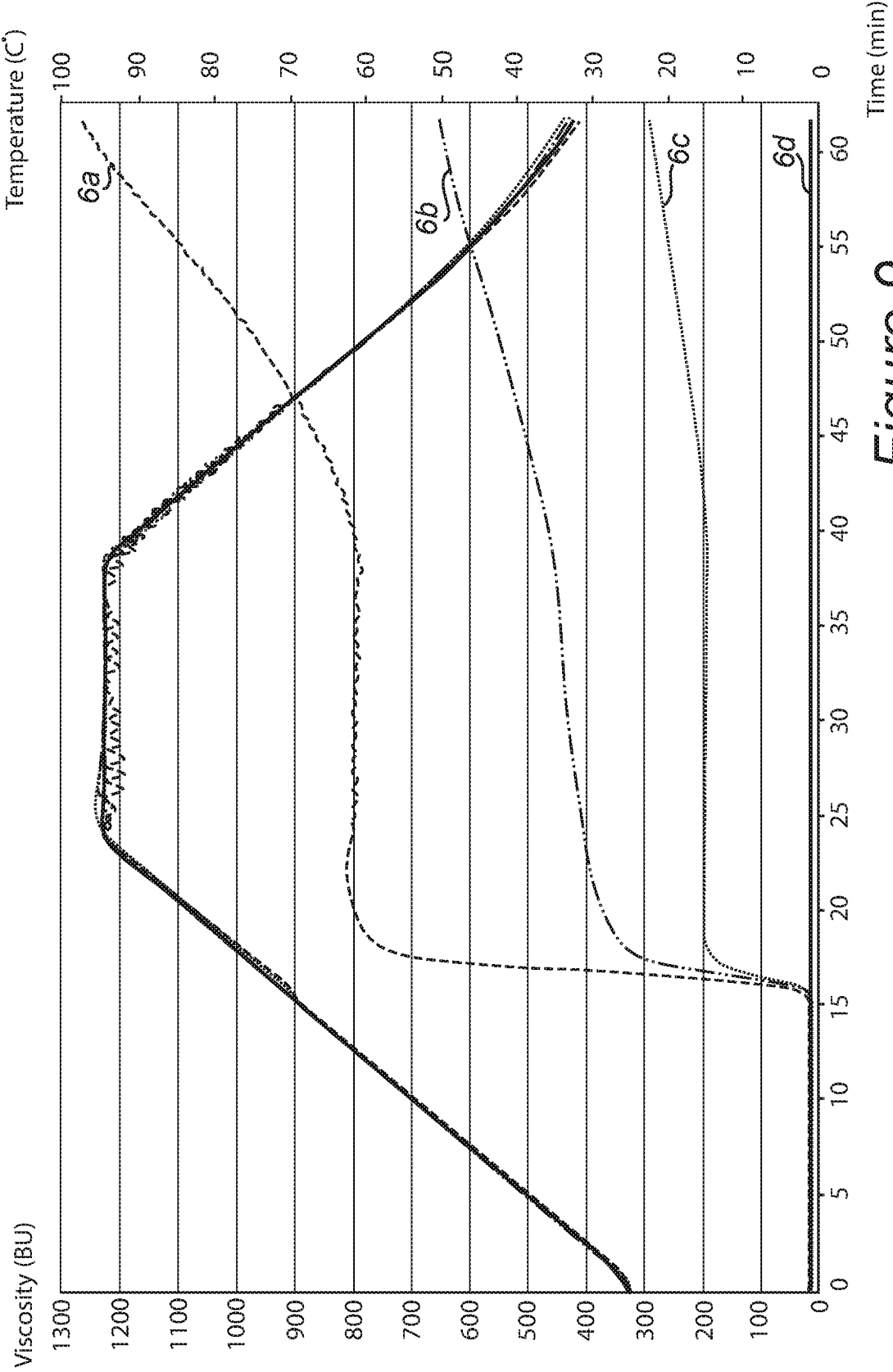
FIG. 9 shows the results from varying the molar ratio between active chlorine added in the form of hypochlorite to ammonia during the reaction at a pH of 11.5. The ammonia addition level has been kept constant and only the addition level for the active chlorine to obtain different molar ratios has been varied. The viscosity is plotted against time for the starch products together with the temperature slope during the Brabender run. The starch slurry has previously been adjusted to neutral pH value.

This example shows how the starch reacts towards different molar ratios between active chlorine and ammonia at high pH >10. The ratio varies between 1/2 and 4/1 in the different examples keeping the addition of molar content of ammonia constant and varying the addition of active chlorine. FIG. 9 shows the variation when being heated in the Brabender at neutral pH and FIG. 10 the same ratios at pH=3.0

6 a) 0.17% Active Chlorine of DM Starch Together with Ammonia (0.13% Nitrogen/DM Starch) in a 1/2 Molar Ratio Between Active Chlorine and Ammonia in a Test Performed at pH 11.5

869.1 g DM waxy maize (corn) starch was mixed with 1600 g cold fresh tap water in a reaction vessel. 4.3 g $NH_4Cl$ was added and dissolved. After this the pH was adjusted to 11.5 using a sodium hydroxide solution. The temperature was adjusted to 30° C. 14.0 ml sodium hypochlorite with active chlorine (107 g/l, density: 1.19 g/cm$^3$) was added during agitation. The added amount of hypochlorite solution contained totally 1.5 g active chlorine. This corresponds to an addition of 0.17% w/w active chlorine of DM starch. The vessel was left under agitation for 180 min, and the temperature was kept at 30° C.

The starch slurry was dewatered to 55% DM and was washed clean with fresh tap water until a KI test showed that the starch filter cake was free from residual hypochlorite. After this, the starch filter cake was further mixed with 890 g fresh cold tap water. The starch slurry was adjusted to a pH of 6.0 with sulphuric acid. The starch product was dewatered and dried to a dry powder with a moisture content below 15%.

6 b) 0.35% Active Chlorine of DM Starch Together with Ammonia (0.13% Nitrogen/DM Starch) in a 1/1 Molar Ratio Between Active Chlorine and Ammonia in a Test Performed at pH 11.5

869.1 g DM waxy maize (corn) starch was mixed with 1600 g cold fresh tap water in a reaction vessel. 4.3 g $NH_4Cl$ was added and dissolved. After this the pH was adjusted to 11.5 using a sodium hydroxide solution. The temperature was adjusted to 30° C. 28.0 ml sodium hypochlorite with active chlorine (107 g/l, density: 1.19 g/cm$^3$) was added during agitation. The added amount of hypochlorite solution contained totally 3.0 g active chlorine. This corresponds to an addition of 0.35% w/w active chlorine of DM starch. The vessel was left under agitation for 180 min, and the temperature was kept at 30° C.

The starch slurry was dewatered to 55% DM and was washed clean with fresh tap water until a KI test showed that the starch filter cake was free from residual hypochlorite. After this, the starch filter cake was further mixed with 890 g fresh cold tap water. The starch slurry was adjusted to a pH of 6.0 with sulphuric acid. The starch product was dewatered and dried to a dry powder with a moisture content below 15%.

6 c) 0.70% Active Chlorine of DM Starch Together with Ammonia (0.13% Nitrogen/DM Starch) in a 2/1 Molar Ratio Between Active Chlorine and Ammonia in a Test Performed at pH 11.5

869.1 g DM waxy maize (corn) starch was mixed with 1600 g cold fresh tap water in a reaction vessel. 4.3 g $NH_4Cl$ was added and dissolved. After this the pH was adjusted to 11.5 using a sodium hydroxide solution. The temperature was adjusted to 30° C. 56.0 ml sodium hypochlorite with active chlorine (107 g/l, density: 1.19 g/cm$^3$) was added during agitation. The added amount of hypochlorite solution contained totally 6.0 g active chlorine. This corresponds to an addition of 0.70% w/w active chlorine of DM starch. The vessel was left under agitation for 180 min, and the temperature was kept at 30° C.

The starch slurry was dewatered to 55% DM and was washed clean with fresh tap water until a KI test showed that the starch filter cake was free from residual hypochlorite. After this, the starch filter cake was further mixed with 890 g fresh cold tap water. The starch slurry was adjusted to a pH of 6.0 with sulphuric acid. The starch product was dewatered and dried to a dry powder with a moisture content below 15%.

6 d) 1.4% Active Chlorine of DM Starch Together with Ammonia (0.13% Nitrogen/DM Starch) in a 4/1 Molar Ratio Between Active Chlorine and Ammonia in a Test Performed at pH 11.5

869.1 g DM waxy maize (corn) starch was mixed with 1600 g cold fresh tap water in a reaction vessel. 4.3 g $NH_4Cl$ was added and dissolved. After this the pH was adjusted to 11.5 using a sodium hydroxide solution. The temperature was adjusted to 30° C. 112.0 ml sodium hypochlorite with active chlorine (107 g/l, density: 1.19 g/cm$^3$) was added during agitation. The added amount of hypochlorite solution contained totally 12.0 g active chlorine. This corresponds to an addition of 1.4% w/w active chlorine of DM starch. The vessel was left under agitation for 180 min, and the temperature was kept at 30° C.

The starch slurry was dewatered to 55% DM and was washed clean with fresh tap water until a KI test showed that the starch filter cake was free from residual hypochlorite. After this, the starch filter cake was further mixed with 890 g fresh cold tap water. The starch slurry was adjusted to a pH of 6.0 with sulphuric acid. The starch product was dewatered and dried to a dry powder with a moisture content below 15%.

Figure 10:
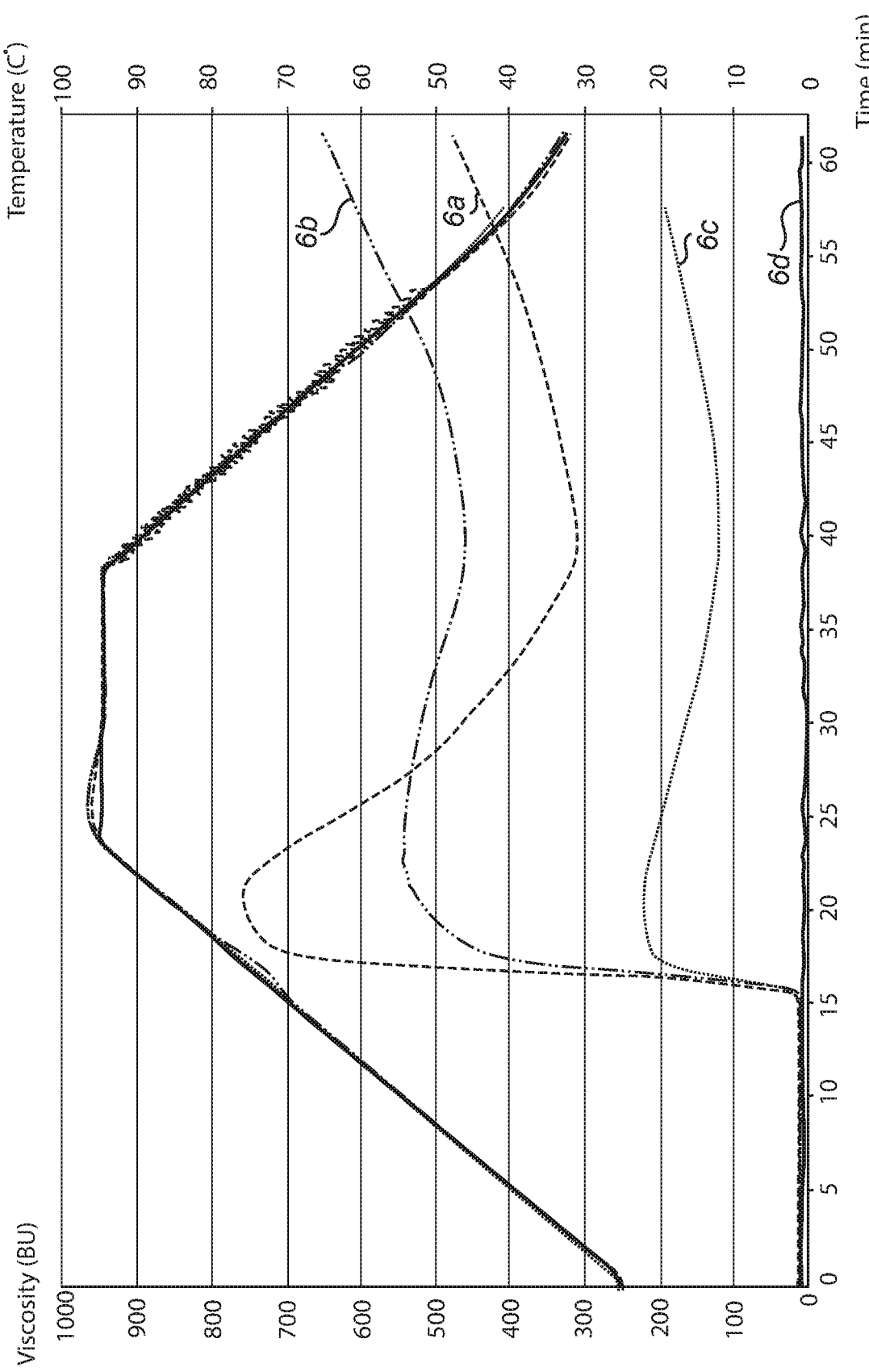
FIG. 10 shows the results from varying the molar ratio between active chlorine added in the form of hypochlorite to ammonia during the reaction at a pH of 11.5. The ammonia addition level has been kept constant and only the addition level for the active chlorine to obtain different molar ratios has been varied. The viscosity is plotted against time for the starch products together with the temperature slope during the Brabender run. The starch slurry has previously been adjusted to a pH value of 3.

The starch inhibition obtained with variation of the molar ratio of active chlorine to ammonia according to Examples 6 a), 6 b) 6 c), and 6 d) are evaluated and seen in FIG. 9 at neutral pH when being heated in a Brabender Amyloviscograph model E run with 75 rpm and a dry solids level of 5% w/w using distilled water and a torsion spring of 350 cmg and at pH 3.0 in FIG. 10. It is obvious from the profiles that a certain ratio is needed to obtain optimum inhibition and that when the addition level of active chlorine goes above a certain ratio a reduction in the viscosity of the starch results.

Example 7

Figure 11:
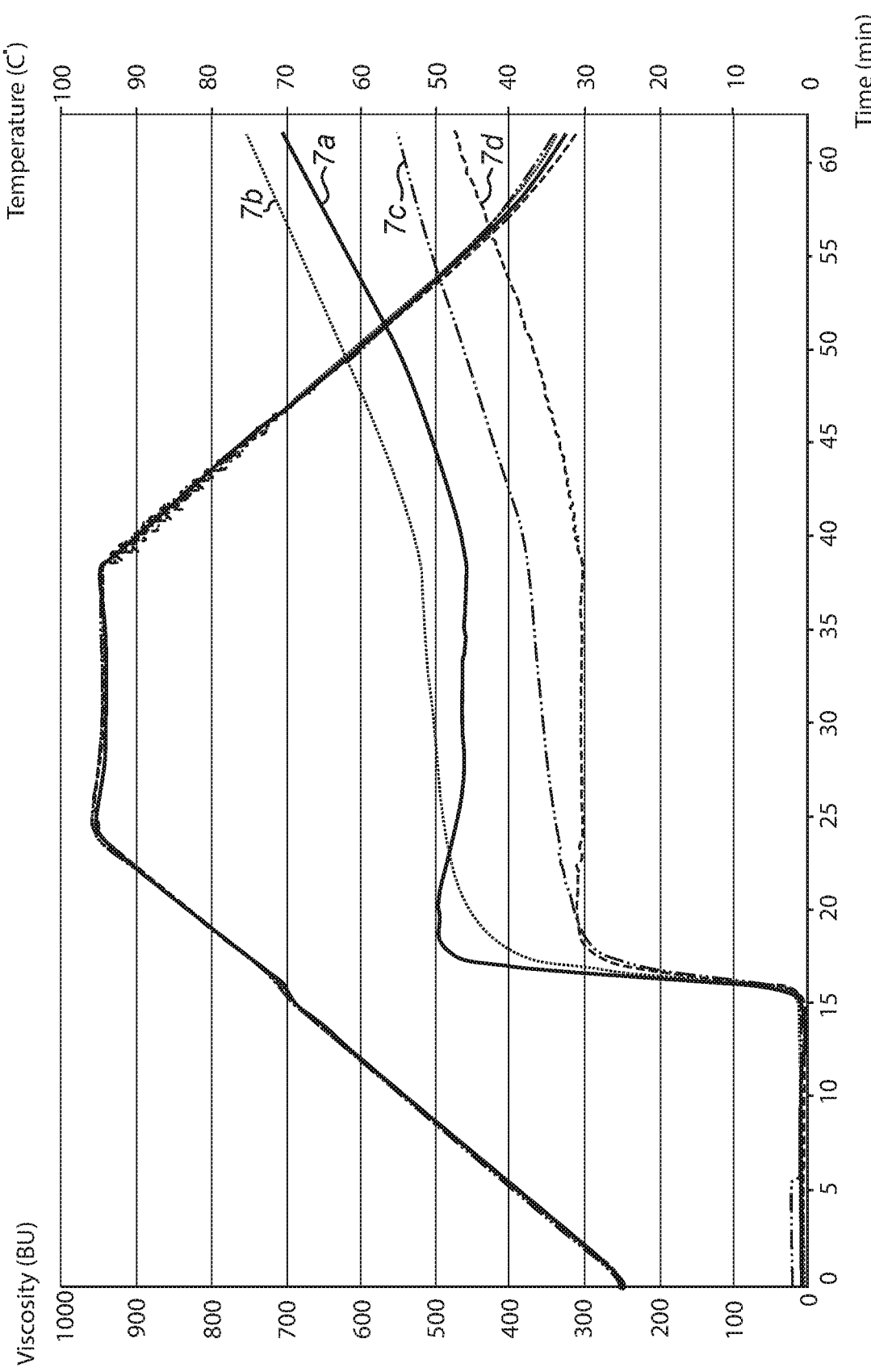
FIG. 11 shows the results from varying the molar ratio between active chlorine added in the form of hypochlorite to ammonia during the reaction at a pH of 11.5. The ammonia addition level has been varied and the addition level for the active chlorine has been kept constant to obtain different molar ratios. The viscosity is plotted against time for the starch products together with the temperature slope during the Brabender run. The starch slurry has previously been adjusted to neutral pH value.

This example shows how the starch reacts towards different molar ratios between active chlorine and ammonia when the addition of the molar content of active chlorine content is kept constant and the addition level of ammonia is varied in the ratio between 1/2 and 4/1. FIG. 11 shows the variation when being heated at neutral pH in the Brabender and FIG. 12 the same ratios at pH=3.0

7 a) 0.70% Active Chlorine of DM Starch Together with Ammonia (0.6% Nitrogen/DM Starch) in a 1/2 Molar Ratio Between Active Chlorine and Ammonia in a Test Performed at pH 11.5

869.1 g DM waxy maize (corn) starch was mixed with 1600 g cold fresh tap water in a reaction vessel. 19.8 g $NH_4Cl$ was added and dissolved. After this the pH was adjusted to 11.5 using a sodium hydroxide solution. The temperature was adjusted to 30° C. 57.0 ml sodium hypochlorite with active chlorine (107 g/l, density: 1.19 g/cm$^3$) was added during agitation. The added amount of hypochlorite solution contained totally 6.1 g active chlorine. This corresponds to an addition of 0.70% w/w active chlorine of DM starch and 5.2 g nitrogen from ammonia source and a dosage of 0.6% nitrogen from ammonia source on DM starch. The vessel was left under agitation for 180 min, and the temperature was kept at 30° C.

The starch slurry was dewatered to 55% DM and was washed clean with fresh tap water until a KI test showed that the starch filter cake was free from residual hypochlorite. After this, the starch filter cake was further mixed with 890 g fresh cold tap water. The starch slurry was adjusted to a pH of 6.0 with sulphuric acid. The starch product was dewatered and dried to a dry powder with a moisture content below 15%.

7 b) 0.70% Active Chlorine of DM Starch Together with Ammonia (0.3% Nitrogen/DM Starch) in a 1/1 Molar Ratio Between Active Chlorine and Ammonia in a Test Performed at pH 11.5

869.1 g DM waxy maize (corn) starch was mixed with 1600 g cold fresh tap water in a reaction vessel. 9.9 g $NH_4Cl$ was added and dissolved. After this the pH was adjusted to 11.5 using a sodium hydroxide solution. The temperature was adjusted to 30° C. 57.0 ml sodium hypochlorite with active chlorine (107 g/l, density: 1.19 g/cm$^3$) was added during agitation. The added amount of hypochlorite solution contained totally 6.1 g active chlorine. This corresponds to an addition of 0.70% w/w active chlorine of DM starch and 2.6 g nitrogen from ammonia source and a dosage of 0.3% nitrogen from ammonia source on DM starch. The vessel was left under agitation for 180 min, and the temperature was kept at 30° C.

The starch slurry was dewatered to 55% DM and was washed clean with fresh tap water until a KI test showed that the starch filter cake was free from residual hypochlorite. After this, the starch filter cake was further mixed with 890 g fresh cold tap water. The starch slurry was adjusted to a pH of 6.0 with sulphuric acid. The starch product was dewatered and dried to a dry powder with a moisture content below 15%.

7 c) 0.70% Active Chlorine of DM Starch Together with Ammonia (0.15% Nitrogen/DM Starch) in a 2/1 Molar Ratio Between Active Chlorine and Ammonia in a Test Performed at pH 11.5

869.1 g DM waxy maize (corn) starch was mixed with 1600 g cold fresh tap water in a reaction vessel. 5.0 g $NH_4Cl$ was added and dissolved. After this the pH was adjusted to 11.5 using a sodium hydroxide solution. The temperature was adjusted to 30° C. 57.0 ml sodium hypochlorite with active chlorine (107 g/l, density: 1.19 g/cm$^3$) was added during agitation. The added amount of hypochlorite solution contained totally 6.1 g active chlorine. This corresponds to an addition of 0.70% w/w active chlorine of DM starch and 1.3 g nitrogen from ammonia source and a dosage of 0.15% nitrogen from ammonia source on DM starch. The vessel was left under agitation for 180 min, and the temperature was kept at 30° C.

The starch slurry was dewatered to 55% DM and was washed clean with fresh tap water until a KI test showed that the starch filter cake was free from residual hypochlorite. After this, the starch filter cake was further mixed with 890 g fresh cold tap water. The starch slurry was adjusted to a pH of 6.0 with sulphuric acid. The starch product was dewatered and dried to a dry powder with a moisture content below 15%.

7 d) 0.70% Active Chlorine of DM Starch Together with Ammonia (0.075% Nitrogen/DM Starch) in a 4/1 Molar Ratio Between Active Chlorine and Ammonia in a Test Performed at pH 11.5

869.1 g DM waxy maize (corn) starch was mixed with 1600 g cold fresh tap water in a reaction vessel. 2.5 g $NH_4Cl$ was added and dissolved. After this the pH was adjusted to 11.5 using a sodium hydroxide solution. The temperature was adjusted to 30° C. 57.0 ml sodium hypochlorite with active chlorine (107 g/l, density: 1.19 g/cm$^3$) was added during agitation. This corresponds to an addition of 0.70% w/w active chlorine of DM starch and 0.65 g nitrogen from ammonia source and a dosage of 0.075% nitrogen from ammonia source on DM starch. The vessel was left under agitation for 180 min, and the temperature was kept at 30° C.

The starch slurry was dewatered to 55% DM and was washed clean with fresh tap water until a KI test showed that the starch filter cake was free from residual hypochlorite. After this, the starch filter cake was further mixed with 890 g fresh cold tap water. The starch slurry was adjusted to a pH of 6.0 with sulphuric acid. The starch product was then dewatered and dried to a dry powder with a moisture content below 15%.

Figure 12:
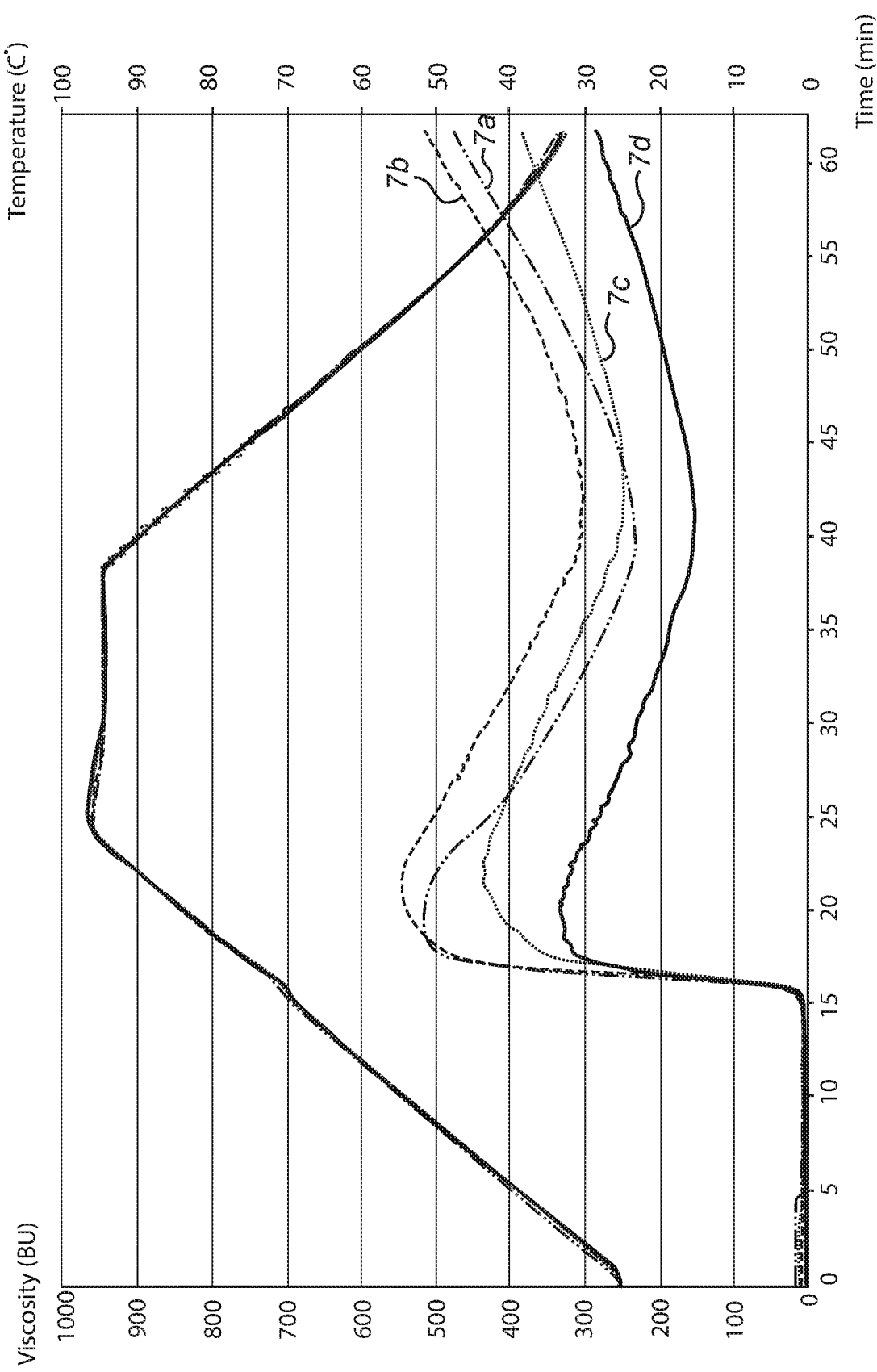
FIG. 12 shows the results from varying the molar ratio between active chlorine added in the form of hypochlorite to ammonia during the reaction at a pH of 11.5. The ammonia addition level has been varied and the addition level for the active chlorine has been kept constant to obtain different molar ratios. The viscosity is plotted against time for the starch products together with the temperature slope during the Brabender run. The starch slurry has previously been adjusted to a pH value of 3.

The starch inhibition obtained with variation of the molar ratio of active chlorine to ammonia according to Examples 7 a), 7 b), 7 c), and 7 d) are evaluated and seen in FIG. 11 at neutral pH and at pH 3.0 in FIG. 12 when being heated in a Brabender Amyloviscograph model E run with 75 rpm and a dry solids level of 5% w/w using distilled water and a torsion spring of 350 cmg. It is obvious from the profiles that the molar ratio between active chlorine and ammonia effects the level of inhibition and that when the addition level of active chlorine is kept constant and varying the level of ammonia an increased viscosity is obtained with increasing amount of ammonia, i.e. with a lower molar ratio between active chlorine and ammonia.

While the invention has been described with reference to a number of embodiments, it will be understood by those skilled in the art that various changes may be made and that equivalents may be substituted for elements thereof without departing from the scope of the present invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method for preparing an inhibited starch, wherein it comprises the steps of
   a) providing a slurry containing a granular starch obtained from a starch containing raw material,
   b) alkalizing the slurry by adding ammonia or by adding one or more compounds having the ability to release or produce ammonia in the slurry,
   c) adjusting the pH of the slurry to a value above 10.0, and
   d) adding at least one oxidant to the slurry for a reaction with said ammonia,
   or
   wherein steps b) and c) are replaced with the step of alkalizing the slurry directly to a pH between 10.0 and 12.0, and the step of adding chloramine or dichloramine to the slurry, and wherein step d) is omitted,
   or
   wherein step c) is replaced with the step of adjusting the pH of the slurry to a value of between 7.0 and 10.0, and wherein step d) is followed by a step of adjusting the pH of the slurry to a value above 10.0.

2. The method according to claim 1, wherein the method further comprises a step of adding at least one organic acid, a bisulfite, or hydrogen peroxide to the slurry with a view to eliminating any residual oxidant, off-taste, and undesired smell.

3. The method according to claim 1, wherein the ammonia added to the slurry or the ammonia released or produced in the slurry is present in an amount of the starch slurry of a percentage selected from the group consisting of: 0.01-10% w/w DM (dry matter) starch, 0.03-5% w/w DM starch, and 0.05-3.0% w/w DM starch.

4. The method according to claim 1, wherein the starch to be inhibited is
   (i) a native granular starch selected from the group consisting of: potato starch, maize (corn) starch, tapioca starch, barley starch, rice starch, wheat starch, rye starch, oat starch, amaranth starch, quinoa starch, sago starch, bean starches, pea starch, Floridian starch, waxy potato starch, waxy corn starch, waxy tapioca starch, waxy barley starch, waxy rice starch, waxy sorghum starch, waxy wheat starch, waxy pea starch, and high amylose starches;
   (ii) a modified starch selected from the group consisting of: modified potato starch, modified maize (corn) starch, modified tapioca starch, modified barley starch, modified rice starch, modified wheat starch, modified rye starch, modified oat starch, modified amaranth starch, modified quinoa starch, modified sago starch, modified bean starches, modified pea starch, modified Floridian starch, modified waxy potato starch, modified waxy corn starch, modified waxy tapioca starch, modified waxy barley starch, modified waxy rice starch, modified waxy sorghum starch, modified waxy wheat starch, modified waxy pea starch, and modified high amylose starches; or
   iii) a combination of at least two from the groups.

5. The method according to claim 1, wherein said one or more compounds having the ability to release or produce ammonia in the slurry is/are
   an ammonium compound and a hydroxide compound to be reacted for releasing ammonia from said ammonium compound,
   an enzyme for releasing ammonia from amino acids already present in the slurry in rest proteins from the starch used,
   an oxidant for releasing ammonia from a-amino acids already present in the slurry in rest proteins from the starch used, or
   an amide, and optionally an alkali or an acid, for releasing ammonia from said amide in the slurry.

6. The method according to claim 1, wherein the oxidant is a source of active chlorine.

7. The method according to claim 1, wherein the pH is adjusted to a value of 11.0-11.5 in step c) of claim 1.

8. The method according claim 1, wherein the reaction temperature during step d) in claim 1 is 5-70° C.

9. The method according to claim 6, wherein the active chlorine is selected from the group consisting of: a hypochlorite, a hypochlorous acid, or chlorine dissolved in water.

10. The method according to claim 1, wherein the oxidant is added in an amount selected from the group consisting of: 0.03-30% w/w DM starch, 0.05-10% w/w DM starch, and 0.1-4% w/w DM starch.

11. The method according to claim 1, wherein the molar ratio between active chlorine and the ammonia source added is in the ratio range of 1/4 to 4/1.

12. The method according to claim 2, wherein said at least one organic acid is citric acid, erythorbic acid, adipic acid, lactic acid, ascorbic acid, and succinic acid, and salt forms of these acids.

13. The method according to claim 2, wherein said at least one organic acid, bisulfite, or hydrogen peroxide is added in an amount selected from the group consisting of: 0.001-5% w/w DM starch, 0.01-3% w/w DM starch, and 0.05-1% w/w DM starch.

14. The method according to claim 1, wherein the pH of the slurry is adjusted to a value of up to 12.0.

15. The method according to claim 5, wherein the ammonium compound is selected from the group consisting of: an ammonium salt of an acid, an ammonium acetate, chloride, and citrate.

16. The method according to claim 5, wherein the hydroxide compound is selected from the group consisting of: a hydroxide of an alkali metal and an alkali earth metal.

17. The method according to claim 9, wherein the hypochlorite is an alkali metal or alkali earth metal hypochlorite.

18. The method according to claim 9, wherein the alkali earth metal hypochlorite is selected from the group consisting of: sodium, calcium, magnesium, or potassium hypochlorite.

* * * * *

UNITED STATES PATENT AND TRADEMARK OFFICE
CERTIFICATE OF CORRECTION

PATENT NO. : 12,384,858 B2
APPLICATION NO. : 17/310090
DATED : August 12, 2025
INVENTOR(S) : Mikael Brynolf et al.

Page 1 of 1

It is certified that error appears in the above-identified patent and that said Letters Patent is hereby corrected as shown below:

On the Title Page

| Column | Line | |
|---|---|---|
| 2 | 1 | Item (74), under "Attorney, Agent, or Firm", delete "CHRISTENSON" and insert -- CHRISTENSEN -- |

In the Claims

| Column | Line | |
|---|---|---|
| 27 | 57 | Claim 4, delete "iii)" and insert -- (iii) -- |
| 27 | 57 | Claim 4, delete "groups." and insert -- groups, and wherein the starch may be modified before it is provided in the slurry in step a) of claim 1 or may be modified after the inhibition, wherein it is modified by acetylation, hydroxypropylation, chemical cross-linking, OSA (octenyl succinic anhydride) modification, enzymatic treatment, dextrinization, gelatinization with a view to making the starch cold water swelling, and a combination of two or more thereof. -- |
| 28 | 10 | Claim 5, delete "a-amino" and insert -- α-amino -- |
| 28 | 1 | Claim 18, delete "claim 9," and insert -- claim 17, -- |

Signed and Sealed this
Thirteenth Day of January, 2026

John A. Squires
*Director of the United States Patent and Trademark Office*